(12) United States Patent
Hager et al.

(10) Patent No.: US 12,060,099 B1
(45) Date of Patent: Aug. 13, 2024

(54) OMNIDIRECTIONAL ITEM IDENTIFYING MOBILE APPARATUS

(71) Applicant: Amazon Technologies, Inc., Seattle, WA (US)

(72) Inventors: Gregory Hager, Baltimore, MD (US); Andre David Brown, Hopkinton, MA (US); Ejaz Ahmed, Needham, MA (US); Gopi Prashanth Gopal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 17/521,633

(22) Filed: Nov. 8, 2021

(51) Int. Cl.
*B62B 5/00* (2006.01)
*B62B 3/14* (2006.01)
*G06Q 10/087* (2023.01)
*G06Q 30/0601* (2023.01)

(52) U.S. Cl.
CPC .......... *B62B 5/0096* (2013.01); *B62B 3/1424* (2013.01); *G06Q 10/087* (2013.01); *G06Q 30/0633* (2013.01); *G06Q 30/0641* (2013.01); *B62B 2203/50* (2013.01); *B62B 2501/00* (2013.01)

(58) Field of Classification Search
CPC . B62B 5/0096; B62B 3/1424; B62B 2203/50; B62B 2501/00; G06Q 10/087; G06Q 30/0633; G06Q 30/0641
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,127,438 B1 | 11/2018 | Fisher et al. | |
| 10,133,933 B1 | 11/2018 | Fisher et al. | |
| 11,436,557 B1 * | 9/2022 | Kumar | G01G 19/387 |
| 11,620,822 B1 * | 4/2023 | Ron | B62B 5/0096 |
| | | | 382/103 |
| 11,636,533 B1 * | 4/2023 | Vora | B62B 3/1408 |
| | | | 705/27.1 |
| 2006/0122855 A1 * | 6/2006 | Prorock | G06Q 50/12 |
| | | | 705/15 |
| 2010/0262554 A1 * | 10/2010 | Elliott | H04W 4/024 |
| | | | 345/173 |
| 2013/0284806 A1 | 10/2013 | Margalit | |
| 2014/0172634 A1 * | 6/2014 | Dogin | G06Q 30/0633 |
| | | | 705/26.8 |

(Continued)

*Primary Examiner* — Erez Gurari
(74) *Attorney, Agent, or Firm* — Lee & Hayes, P.C.

(57) ABSTRACT

This disclosure describes, in part, a mobile apparatus for identifying items within a facility using an omnidirectional imaging system. For instance, the mobile apparatus may include a main frame, a chassis attached to the main frame, a basket that attaches to the chassis in order to prevent the basket from contacting the main frame, and an omnidirectional imaging system providing image data in and around the mobile apparatus. A user may place item(s) within a receptacle of the basket. The mobile apparatus may further include a handlebar module attached to the main frame, the handlebar module including the omnidirectional imaging system and a computing system for identifying items and events in and around the cart.

20 Claims, 14 Drawing Sheets

(56) References Cited

U.S. PATENT DOCUMENTS

| | | | | |
|---|---|---|---|---|
| 2016/0180670 A1* | 6/2016 | Swope | ............... | G08B 13/2485 |
| | | | | 340/568.5 |
| 2017/0186072 A1* | 6/2017 | Clark | ................. | G06Q 30/0633 |
| 2018/0218351 A1* | 8/2018 | Chaubard | ............ | G07G 1/0081 |
| 2018/0315011 A1* | 11/2018 | Clarke | ............... | G06Q 20/3224 |
| 2019/0118844 A1* | 4/2019 | Li | ....................... | G07G 1/0081 |
| 2020/0027148 A1* | 1/2020 | Li | ....................... | G06Q 30/0631 |
| 2020/0108851 A1* | 4/2020 | Hagen | .................. | B62B 3/1464 |
| 2021/0300453 A1* | 9/2021 | Hagen | .................. | B62B 5/0096 |
| 2023/0311968 A1* | 10/2023 | Ruf | ...................... | B62B 3/1424 |
| | | | | 280/33.992 |

* cited by examiner

OMNIDIRECTIONAL ITEM IDENTIFYING MOBILE APPARATUS

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras and weight sensors, that are configured to determine the items that are placed into the shopping cart by the customer. In these circumstances, the shopping cart may then update a list of items for the customer, display the list of items to the customer, and/or send the list of items to a system for processing of a transaction for the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
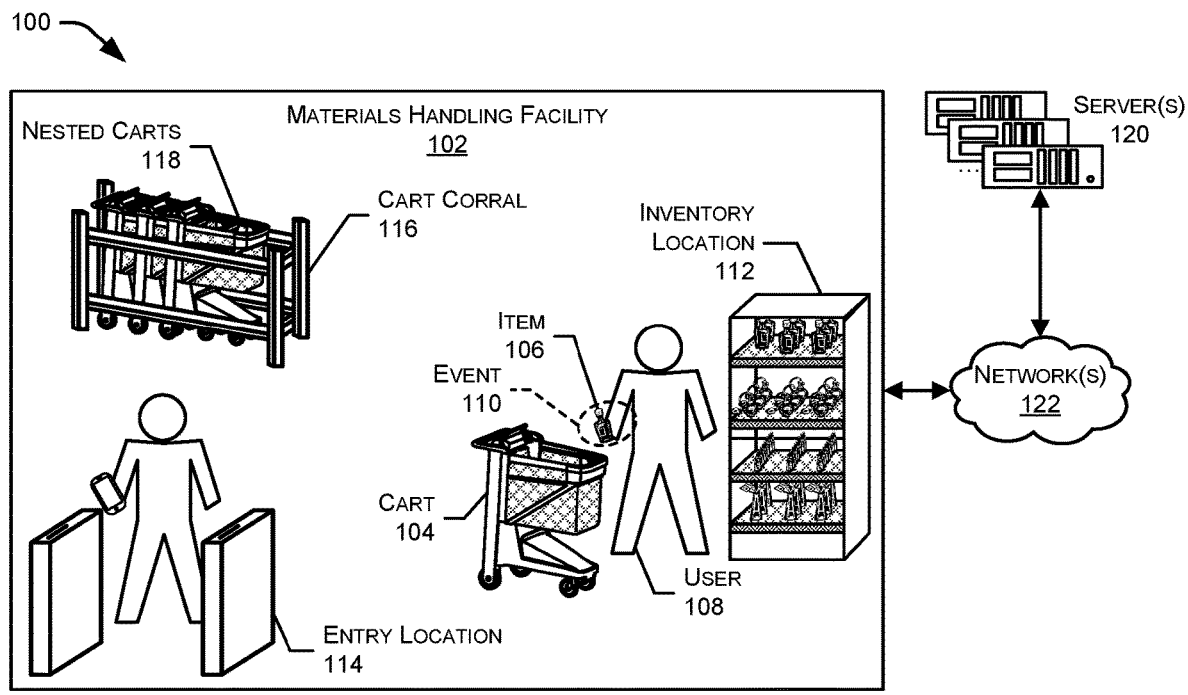
FIG. 1 illustrates an example environment of a materials handling facility that includes an item-identifying cart to identify items placed in, and removed from, a basket of the cart by a user, according to at least one example.
Figure 1:
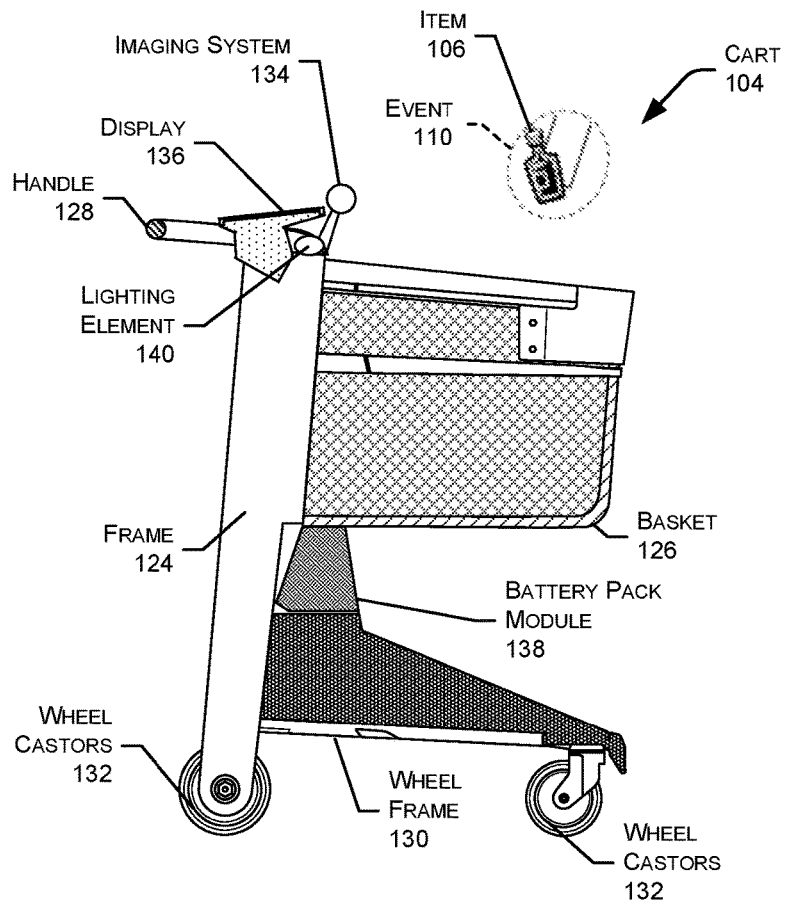

This disclosure is directed to item-identifying carts that may be utilized by users in material handling facilities to automatically identify items that the users place in their carts as they move around the material handling facilities, as well as to identify the users operating the carts. Upon identifying a user operating a cart and items placed into the cart, the item-identifying cart may update a virtual shopping cart of the user to represent the items that have been placed in, or removed from, the physical cart. According to the techniques described herein, an item-identifying cart (or "smart cart") may include one or more cameras positioned on a frame of the cart providing a view both in and around the cart. The one or more cameras may include one or more omnidirectional camera systems that may be attached to the frame of the cart. The omnidirectional camera may be used to gather image data of the user pushing the cart, items placed in the cart, and the environment surrounding the cart. The cart may include components for associating the image data from the omnidirectional camera with the user, with one or more items, or with environment surrounding the cart. In some examples, the cart may send the image data to one or more remote servers for determining these associations.

The cart may include one or more components that analyze the image data to determine an item identifier for the item(s) placed in the cart or removed from the cart, identify item(s) placed in the cart based on image identification, and update a virtual shopping cart for the user of the cart. Once a user has finished their shopping session, the user may be able to efficiently check-out of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include an omnidirectional camera system, memory that stores software components for identifying users and/or items and for performing other operations for managing virtual shopping carts, at least one processor to execute the software components, and at least one battery to power the components of the cart. The omnidirectional camera may include one or more wide angle lenses or fisheye lenses directed in a first direction and having a field of view of over one hundred and eighty degrees with a second wide angle lens directed in a second direction opposite the first such that the image devices may provide a view of an entire environment in and around the cart. The omnidirectional camera may be connected to the frame toward a location where a user would typically push the cart. The omnidirectional camera may generate image data, such as image data of a mobile phone of a user representing visual indicia (e.g., a barcode) associated with an account of the user, identifying items brought to the cart by the user, and identifying user interactions and environment away from the cart. The omnidirectional camera may generate a single view of the environment surrounding the cart and may implement one or more imaging devices to generate the single view of the surrounding environment. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account. Additional data may be gathered concerning the environment including user interactions with items in the facility, facility conditions, and locations of items in and around the cart.

In some instances, the smart cart may also include one or more displays, which in some instances may reside adjacent the omnidirectional camera such that the display is viewable by the user operating the cart. The display may present content that is customized for the user at least partly in response to the cart identifying the user via the image data from the camera. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like. In another example, the display may present information based on the location of the cart within the facility. The location may be determined based on image data from the omnidirectional camera, and in response to locating the cart, such as in a produce section of a grocery store, or a particular aisle of a store, promotions relevant to the location may be presented on the display.

The omnidirectional camera may gather image data that captures items that are placed in the cart, brought near the cart, and removed from the cart, by a user. The image data may be analyzed by the software component(s) of the cart, and/or by remote server(s), using one or more image processing techniques, such as text recognition, object recognition, and/or any other technique. The software component(s) may identify or determine item identifiers for the items represented in the image data, and also determine whether the user is adding items to the cart, or removing items from the cart, and update a virtual shopping cart for the user's shopping session (e.g., add an item to a list of items to be purchased by the user, or remove an item from the list of items to be purchased). In this way, the cart may identify and track items that are retrieved from different locations within the facility, and maintain a virtual shopping cart, or virtual list, of the items selected by the user to provide a more seamless and efficient checkout experience for the user. In some examples, the omnidirectional camera may gather image data that captures interactions of the user away from the cart, such as interactions with items on a shelf to aid in identification of items based on an origin of the item from the shelf. In some examples, the omnidirectional camera may gather image data of the surrounding environment from which facility state data, such as inventory level, planogram layout, and organization or cleanliness of the facility may be determined.

In some examples, the cart may have a frame around an upper perimeter of the basket or receptacle where the omnidirectional camera may be coupled such that the environment around the cart as well as the interior of the cart are visible to the omnidirectional camera. In some examples, the omnidirectional camera may be a camera system that includes multiple camera devices as well as other components, such as light sources (e.g., light emitting diodes (LEDs)) to activate and emit light on the items such that the items are illuminated in the image data to help improve processing of the image data to identify the items. In other instances, the cameras may reside adjacent the light sources.

Although the cameras may be positioned anywhere on the cart, in some examples, the omnidirectional camera may be placed adjacent the handle of the cart or at any other location of the cart to view the interior of the basket as well as the surrounding environment. The omnidirectional camera may be placed adjacent the handle such that the carts may still be capable of "nesting" together in a line when stored at a facility, similar to traditional shopping carts.

Due to the battery life constraints of the cart, it may be advantageous in some examples to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, capacitive sensors, etc.) that generate sensor data to detect movement of an item in, out, or adjacent to the cart while the cameras and/or light sources are de-activated or in a low-power state. In this way, proximity sensors, which may consume less power than the cameras and/or light sources, may detect movement proximate the cart before the cameras and/or light sources are activated. In some examples, the low-power state may still enable the omnidirectional camera to capture image data of the environment at a distance, while detailed or high resolution data may be gathered when out of the low-power mode.

Because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. The omnidirectional camera may still be able to provide a view into the bags within the basket.

In some examples the cart may be part of a fleet of carts that may cooperate to gather data about user interactions with items in the facility as well as identify items picked by users from the shelves of the facility. Because the user may walk away from a cart while shopping, they may move away from a field of view of the cart. In such examples, other carts in the fleet may identify the user as a user associated with a separate cart and may convey data regarding the user's interactions to a remote computing device and/or to the user's cart. In some examples, the cart may be used to update the state of the facility, such as by monitoring inventory of the facility and identifying when inventory on the shelves is low or missing. In some examples, the cart or a fleet of carts may be used to map the layout of the store and generate a virtual planogram of the store. In some examples, the cart or fleet of carts may be used to identify areas within the facility in need of maintenance or cleaning, such as when items are placed on an incorrect shelf as determined by the planogram or when items are in an aisle or otherwise disorderly.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or looking into the omnidirectional camera for facial recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the cart (e.g., within 6 inches, within 1 foot, within 2 feet, etc.). The sensor data may be analyzed to trigger the light sources to begin illuminating light and the cameras to begin generating image data. The image data generated by the omnidirectional camera may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

In examples of use, the smart cart may be pushed around the facility by the user with the omnidirectional camera gathering image data of the surrounding environment as well as the interior of the cart. As the omnidirectional image data is gathered, items and interactions of the user may be identified to determine areas of interest of the user within the facility as well as items selected for purchase. In some examples, the omnidirectional image data may include image data corresponding to other users within the facility, such as other user selections within the facility. In some examples, the other user interaction may be conveyed to a remote server or to a cart associated with the user viewed in the image data. In some examples, the image data may be used to generate a virtual layout (e.g., planogram) of the facility, determine inventory available within the facility, or otherwise determine a state of the facility that may be communicated to a computing device of the facility.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the item-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility that includes an item-identifying cart to identify items placed in, and removed from, a basket of the cart by a user, according to at least one example.

FIG. 1 illustrates an example environment 100 of a materials handling facility 102 that includes an item-identifying cart 104 to identify items 106 placed in, and removed from, a basket of the cart 104 by a user 108 using an omnidirectional imaging system 134. The omnidirectional imaging system 134 may generates image data for identifying a user and depicting the item 106 as well as the environment surrounding the cart 104. In addition, the cart 104 may analyze the image data to identify an item identifier for the item 106, determine the event 110 involving the item (e.g., add to cart, remove from cart, multiple items, quantity of items, select from shelf, put back on shelf etc.) and update a virtual shopping cart and/or an event log associated with the identified user 108 using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the cart 104 (e.g., shopping cart). The inventory location 112 may house one or more different types of items 106 and the user 108 may pick (i.e., take, retrieve, etc.) one of these items 106. Though the user 108 may select multiple items from a shelf without placing some or all in the cart 104, the omnidirectional imaging system 134 may identify the removal of multiple items and may generate an event log that may be used to identify and record interactions with the facility 102.

As illustrated, the materials handling facility 102 (or "facility") may have one or more entry locations 114, such as lanes. The entry location 114 may be defined by a gate in some examples and may include a movable barrier to control movement of users 108. For example, the gate may include computer-controlled panels that may be closed to impede passage of the users 108 or opened to permit passage of the user 108. Upon entering a facility 102, a user 108 may desire to utilize a cart 104 for their shopping session to transport items 106 around the facility 102 during their shopping session. In such examples, the user 108 may approach a cart corral 116, or other locations, at which carts 104 are stored. In some examples, the cart corral 116 may comprise a structure, such as an aisle, for storing nested carts 118.

Generally, two or more of the carts 104 may be configured to nest or otherwise functionality join with one another, so that the carts 104 may be easily stored in a cart corral 116, and/or transported in bulk. The omnidirectional imaging system 134 may not prevent the nesting of the carts 104 while still providing views in and around the cart 104. In some examples, the cart corral 116 may provide additional functionality beyond storage. For instance, the cart corral 116 may facilitate charging of the nested carts 118 that are in the cart corral 116. For instance, the cart corral 116 may have various electrical contacts extending along the length of a horizontal and/or vertical member of the corral 116 that, when placed in electrical contact with an electrical contact of the nested carts 118, charge one or more batteries of the nested carts 118. In other examples, power cords may extend from the cart corral 116 that may be plugged into the nested carts 118 to recharge batteries of the nested carts 118 while not in use.

To utilize a cart 104, a user 108 may approach an unused cart that is not currently engaged in a shopping session (e.g., a nested cart 118), and interact with the unused cart 104 to identify themselves to the cart 104 and begin a shopping session. For instance, the omnidirectional imaging system 134, which may include one or more imaging devices (e.g., an image sensor such as a camera, photodetector, or other sensing apparatus designed to read a one or two-dimensional barcode) such that when a user 108 presents a user device, or portion thereof, such as the display, to the omnidirectional imaging system 134, the cart 104 may identify the user and corresponding user account for a shopping session. Other types of interaction may be performed by a user 108 to identify themselves to a cart 104 (e.g., uttering a name or other keyword to identify the user 108, presenting the user's face for facial recognition, typing in a password or other user information into a display of the cart 104, and/or any other type of user identification technique).

Once a user has identified themselves to the cart 104, the item-identifying functionality of the cart 104 may be activated such that subsequent items 106 viewed, selected, and/or placed in the cart 104 will be identified by the cart 104 and added to a virtual shopping cart for the user 108 and/or the event log. As illustrated, a user 108 may move the cart 104 around the facility 102 to one or more inventory locations 112. The user 108 may retrieve items from the inventory location 112 and place the items 106 in the cart 104. As items are removed, the omnidirectional imaging system 134 may gather image data and record in the event log events indicative of the interaction. Additionally, the user 104 may retrieve items 106 from the cart 104 and put the items 106 back in an inventory location 112, such as when the user 108 changes their mind regarding their desire to purchase or otherwise acquire the item 106. The cart 104 may include various components for identifying item identifiers corresponding to the items 106 placed in the cart and maintaining a virtual shopping cart and event log for the shopping session of the user 108.

Once the user 108 has finished their shopping session, the user 108 may end the shopping session in various ways. For instance, the user 108 may return the cart 104 to the cart corral 116, provide input to the cart 104 indicating an end of the shopping session (e.g., utterance, utilize a user interface element on a touch display, etc.), or simply remove item bags or other item carriers from the cart 104 and leave the facility 102. After the user 108 has ended their shopping session, the list of item identifiers in the virtual shopping cart may be uploaded to one or more remote servers 120, over one or more networks 122, that manage user accounts for users 108 of the facility 102. In some examples, the event log may be compared against the virtual cart to verify that the virtual cart includes all items selected by the user except for items returned to the shelves. In this manner, the cart may provide a theft detection system and/or verification for audit of the virtual cart. The server(s) 120 may charge the appropriate user account for the listing of the items in the virtual shopping cart that the user took from the facility 102. For instance, the server(s) 120 may be configured to determine or generate information indicative of a cost of the items 106 picked by the user 108. Additionally, the server(s) 120 may store payment information (e.g., credit card information, bank account information, etc.) for each user account. In this way, when the user 108 finished their shopping session and the cart 104 sends the listing of item identifiers in the virtual shopping cart over the network(s) 122 to the server(s) 120, the server(s) 120 may be configured to determine a cost or price for all of the listed item identifiers, and charge the user via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The cart 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the cart 104. While the servers 120 are illustrated as being in a location outside of the facility 102, in other implementations, at least a portion of the servers 122 may be located at the facility 102.

As illustrated, the cart 104 may generally include or be formed of a frame 124, a basket 126, a handle 128 for pushing the cart 104, a wheel frame 902, and one or more wheel castors 132 to enable movement of the cart 104 on a surface. The frame 124, the basket 126, the handle 128, and the wheel frame 902 may be formed from any suitable materials such as plastics, wood, metals, composites or any other combinations of materials. Moreover, frame 124, the basket 126, the handle 128, and the wheel frame 902 may take any form.

The basket 126 may generally be part of the frame 124 and/or supported by the frame 124 (e.g., be welded, fused, adhered, bolted, screwed, molded, or otherwise joined to the frame 124). In some examples, the basket 126 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The grid structure of the basket 126 may allow the omnidirectional imaging system 134 to view items placed on a lower portion of the cart 104. The basket 126 may generally be any shape that defines an interior cavity, or receptacle, for receiving items 106 that are placed in the cart 104. The basket 126 may comprise a bottom, multiple sides protruding from the bottom, and a top. As illustrated, the bottom basket 126 may be in the shape of a quadrilateral such that there are four sides protruding from the bottom of the basket 126. Similarly, the top of the basket 126 may be defined according to the quadrilateral shape and have a perimeter with four corners. The perimeter of the top of the basket 126 may define an opening to the interior cavity (or receptacle) of the basket 126 to receive items placed inside the basket 126. In various examples, the perimeter of the top of the basket may be disposed in a substantially horizontal plane (e.g., a plane substantially parallel with a support surface), and the frame 124 may include at least one vertical member that extends downward from the basket 126 to the wheel frame 902 along a substantially vertical plane (e.g., a plane substantially along the y-axis as illustrated).

The wheel frame 130 may support one or more wheel castors 132 to enable movement of the cart 104 along a surface. The wheel casters 132 include one or more wheels, axles, forks, joints or other components which enable the cart 104 to travel on various surfaces. For example, in some implementations each of the wheel casters 132 may include a single wheel provided on an axle within a fork, or two or more wheels provided on such an axle. In some other implementations, the wheel casters 132 may include two or more axles. Alternatively, in still other implementations, a single caster may be provided in lieu of the multiple wheel casters 132 shown in FIG. 1. In accordance with the present disclosure, the wheel casters 132 may operate in any manner, such as being configured to pivot or swivel, and thus automatically adjust or align with a direction of travel. In some examples, the cart 104 may be equipped with other apparatuses for enabling the cart 104 to travel on solid surfaces, including one or more wheeled components other than casters, including but not limited to omnidirectional wheels, spherical wheels or other like apparatuses. Additionally, in some other implementations, the cart 104 may include two or more skis or other runners for traveling on smooth surfaces. In still other implementations, the cart 104 may be levitated, e.g., by magnetic levitation through the use of one or more linear induction motors. Moreover, the cart 104 may be propelled or pushed by humans or autonomous mobile robots or, alternatively, by one or more motors (e.g., electric-powered or gasoline-powered).

As illustrated, the cart 104 may include an omnidirectional imaging system 134 for identifying a user operating the cart as described above, identifying items placed in the basket 126 and removed from the basket 126, and identifying events and interactions outside of and adjacent to the cart 104. The imaging system 134 may, in some instances, be positioned in a manner such that an FOV of the imaging system 134 includes a three hundred and sixty degree view around the cart 104. In some examples, the FOV may be less than three hundred and sixty degrees, such as two hundred and seventy degrees, with a portion of the FOV blocked, for example the portion facing the user or directed directly upwards or downwards towards the ceiling or floor of the facility 102. The imaging system 134 may provide an omnidirectional view by providing a single view of the surrounding environment around the cart 104. In some examples, the imaging system may include image data covering nearly three hundred and sixty degrees around the cart 104. In some examples, the imaging system 134 may not provide a view of the entire surroundings, for example, excluding where occluded by the display 136, and may not include image data showing an area directly above or below the cart 104. The imaging system 134 may be positioned at any location on the cart 104 (e.g., in the basket 126, on the basket 126, mounted to the frame 124, mounted to the basket 126, and/or any other location), oriented to have respective FOVs for identifying events that occur within and proximate to the cart 104. In some examples, the imaging system 134 may be augmented by one or more additional sensors, including a barcode scanner or a proximity sensor that may be used to item identification as items are brought into the basket 126.

In some examples, the cart 104 may further include one or more one lighting elements 140 (e.g., LED) for emitting light at or in response to a detection of an item being placed in the cart 104. The lighting element 140 may be triggered by a proximity sensor 142 or based on the image data from the imaging system 134. The cart 104 may further include, in some instances, one or more proximity sensors 142 (e.g., ToF sensor, PIR sensor, etc.). In some examples the proximity sensors 142 may be activated to detect the proximity of items 106 or other objects above the top of the basket 126. The proximity sensors 142 may be configured to generate sensor data that indicates distances between objects above the top of the basket 126 of the cart 104 and the second imaging devices. The cart 104 may include components configured to analyze the sensor data and determine that an item 106 is within some threshold distance from the top of the basket 126 and/or within the basket 126. Upon detecting an object within the threshold proximity of the basket 126 using the proximity sensor 142, one or more components of the cart 104 may cause the lighting element 140 (LEDs) to emit light and cause the imaging system 134 to generate image data of an illuminated item identifier. In some examples, the FOVs of the image devices forming the imaging system 134 may each at least partially overlap. The lighting element 140 may illuminate the basket 126 and/or the area above the top of the basket 126 to illuminate items 106 being placed in the cart 104, or removed from the cart 104, to act as a "flash" for the camera generating image data. The imaging system 134 may generate image data for a predefined period of time and/or until the proximity sensors 142 (or the image data itself) indicates that there is no longer an object within the threshold distance from the cart 104 or top of the cart 104.

After generating the image data, one or more components of the cart 104 may process the image data to determine an item identifier for the item(s) 106 represented in the image data, and an event 110 for the image data (e.g., addition of an item 106 to the cart, removal of an item 106 from the cart, interaction on a shelf, view on a shelf, replace on a shelf, etc.). As described in more detail below with respect to FIGS. 9 and 10, the cart 104 may include component(s) to determine an item 106 identifier for the item 106 (e.g., name of the item 106, SKU number for the item 106, image recognition, etc.), and determine if the item 106 is being taken from the cart 104, added to the cart 104, removed from a shelf, replaced on a shelf, or other events based on the motion of the item 106 and the result of the movement around the cart 104 once movement is no longer detected and represented by the image data. The components of the cart 104 may then update a virtual shopping cart and/or an event log associated with the cart 104 that indicates a virtual listing of items 106 taken by the user 108 from the facility based on the determined event 110. In some examples, the image data may be transmitted to the server(s) 120 over the network(s) 122 where the processing may be performed.

In various examples, the cart 104 may include a display 136 to present various information in user interface(s) for the user 108 to consume. In some examples, the display 136 may comprise a touch screen to receive input from the user 108 (e.g., a selection of an item identifier to disambiguate amongst potential item identifiers). In some instances, the display 136 may present customized information to the user 108 upon identifying the user 108, such as a shopping list of the user or the like. In some examples, as described further below, the display 136 may display information based on a location within the facility. For example, the display 136 may show ads relevant to the location within the facility 102 or a portion of a shopping list relevant to the location within the facility 102.

The cart 104 may further include a battery pack module 138 that houses one or more batteries to power the components of the cart 104. The battery pack module 138 may include rechargeable batteries. In some examples, the battery pack module 138 may be detachably coupled to the wheel frame 902 and/or the frame 124 of the cart 104 such that the battery pack module 138 may be removed and taken to a charging station. In various examples, the battery pack module 138 may include rechargeable batteries that may be charged when the cart 104 is placed in a cart corral 116 (e.g., through electrical contacts, power cords, etc.). In various examples, the frame 124 and/or basket 126 may have one or more channels (e.g., grooves, holes, paths, tunnels, etc.) through which power cables/cords may pass. In this way, power cables may be run at least partially through the channels in the frame 124 and/or basket 126 inconspicuously to provide power to the various components of the cart 104.

In some instances, the cart 104 may further include one or more lighting elements 140 disposed on the frame 124 and/or basket 126 of the cart 104 as discussed above for providing a flash or additional lighting during image generation. The user 108 may, in some instances, operate a controller to turn on (and off) the lighting element(s) 140 to cause the lighting element(s) 140 to emit light. Further, in some instances the controller may enable the lighting element(s) 140 to transition between multiple light states, such as different colors, flashing effects, and/or the like. The controller operable by the user 108 may comprise functionality accessible to the user 108 via the display (e.g., one or more soft buttons for turning on and/or off the light), a physical toggle switch on the frame 124 of the cart 104, and/or the light. Further, the lighting element(s) 140 may be used to signal a predefined state of the cart 104 and/or the user 108. For example, the user 108 may turn on the lighting element(s) 140 to indicate that he or she requests assistance from an associate of the facility 102, or for any other reason. In some instances, in response to the user 108 operating a controller to request assistance, the cart 104 may perform one or more actions in addition to turning on the lighting element(s) 140. For example, the display may present content responding to this request, such as an offer to connect the user 108 with an associate of the store (e.g., in person, via I/O devices of the cart, etc.). For example, in response to requesting assistance, the cart 104 may facilitate an audio-only or an audio/video call between the user 108 and an associate of the facility using one or more I/O devices on the cart, such as the display, one or more speakers, one or more microphones, one or more cameras pointed toward the user 108 and/or the like.

In still other instances, associates of the facility may, remotely or otherwise, operate the lighting element(s) 140 to change states (e.g., turn on or off) and/or the cart 104 may include components to automatically change a state of the lighting element(s) 140. For example, upon the card identifying that an item of a predefined class of items has entered the basket, the cart 104 may cause the lighting element(s) 140 to change state (e.g., from an off state to an on state) to indicate that an additional checkout workflow may now be required. For example, if the user 108 places an item into the basket 126 that requires the purchasing user to be of a certain age (e.g., alcohol) or to have a certain prescription (e.g., medicine), the cart 104 may illuminate the lighting element(s). In some instances, the cart 104 may include a lighting element on a right side of the frame, a lighting element on a left side of the frame, and/or one or more other lighting elements in other locations on the cart 104.

Figure 2:
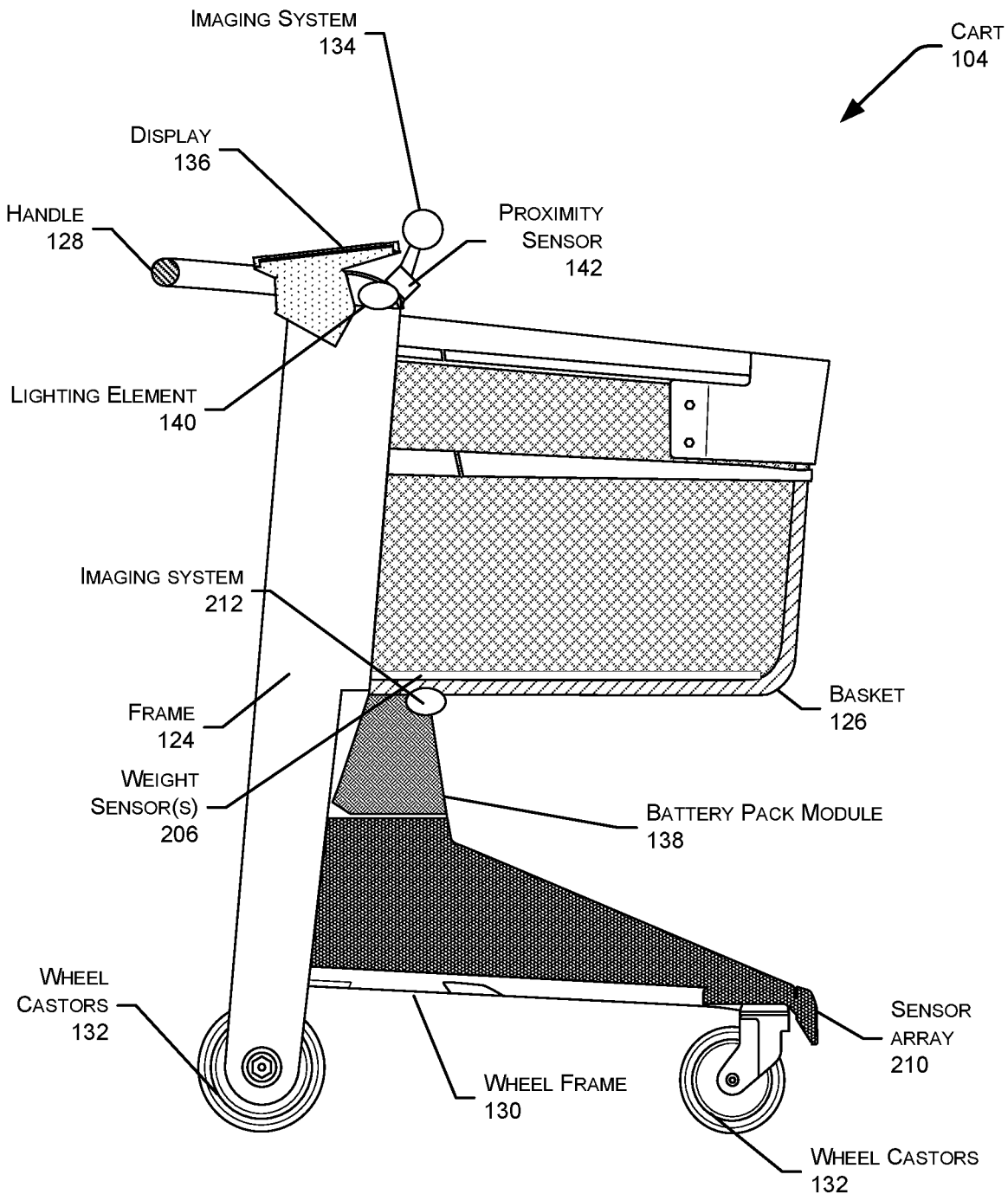
FIG. 2 illustrates the cart of FIG. 1 in further detail, according to at least one example.

FIG. 2 illustrates the cart 104 of FIG. 1 in further detail. As illustrated, the cart 104 may include the omnidirectional imaging system 134 for identifying a user, for identifying items placed into or removed from the basket 126, and for gathering image data for events in and around the cart 104, the display 136 for presenting information to a user operating the cart 104, and the one or more lighting elements 140.

In addition, the basket 126 may include one or more weight sensors 206 for determining a current weight of items placed in the basket 126. For example, the weight sensor 206 may comprise a strain gauge or other sensor that continuously or periodically may be used to determine a weight of items placed in the basket 126 and/or whether a change in weight has occurred.

This weight data may be used to identify when items have been placed into or removed from the basket 126 and, in some instances, may be used to identify items placed into or removed from the basket 126 or verify an identity of an item. For example, the weight data may be used to determine the identity of an item placed into or removed from the basket (e.g., to identify that a bottle of ketchup was placed into the basket and verify that the weight of the ketchup matches with the weight determined), identify a number of instances of an item (e.g., a number of bottles of ketchup placed into the basket), to measure an amount of something (e.g. 1 pound of peanuts), and/or the like.

In some examples, the cart 104 may include a second imaging system 212 positioned beneath the basket 126. The second imaging system 212 may be positioned and configured to capture image data representative of a lower shelf and wheel frame 130 of the cart 104. Items placed on the lower shelf may be detected and scanned using the second imaging system 212. In this manner, objects that may be too heavy to easily lift into the basket 126 may be placed underneath and still accounted for by the system.

FIG. 2 further illustrates that the cart 104 may include a sensor array 210, which may be used for determining a location of the cart 104 within the facility 102 or gathering data while the cart 104 is in use. In some instances, the sensor array 210 may include RFID sensors, proximity sensors, imaging devices, and other such sensors. In some instances, the cart 104, or a remote system communicatively coupled to the cart 104, may store map data that indicates associations between respective location with the facility to respective items detectable by the sensor array 210 throughout the facility. As illustrated, in some instances the sensor array 210 may reside near a bottom portion of the frame of the cart 104. In other instances, however, the sensor array 210 may reside at other locations on the cart 104 and/or distributed at multiple locations on the cart 104. In some examples, the location of the cart 104 may be determined based on image data from the imaging system 134 identifying markers or items within the facility 102.

Figure 3:
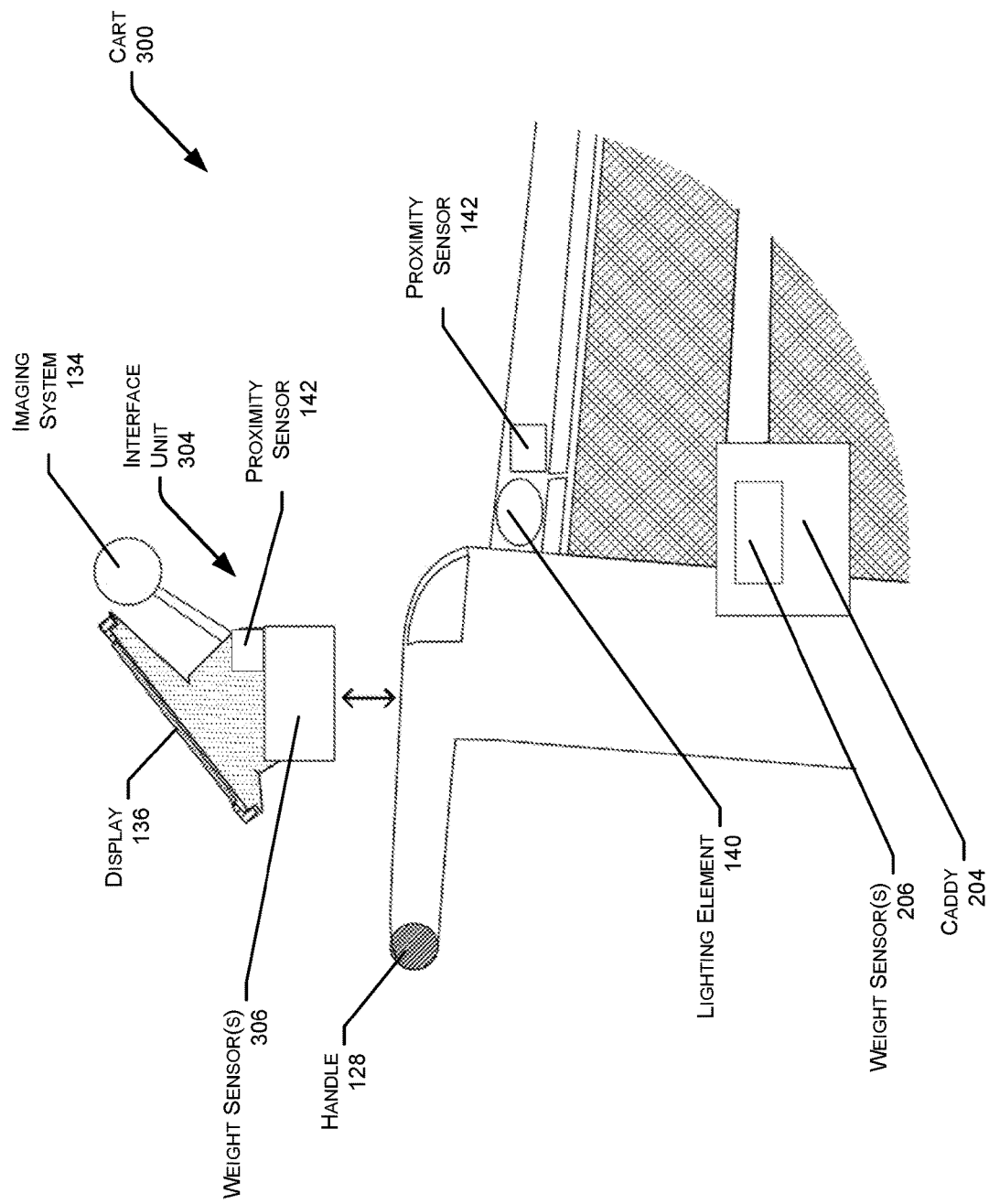
FIG. 3 illustrates a detail view of an example cart with a interface unit, according to at least one example.

FIG. 3 illustrates a detail view of an example cart 300 with a interface unit 304, according to at least one example. The interface unit 304 may be a standalone unit that may be permanently affixed in a particular location within a facility, for example to be used in a produce section of a grocery store. In such examples, the cart 300 may not be present, and only the interface unit 304 may be used. The example cart 300 may include elements similar to those described above with respect to cart 104. For example, the cart 300 may include a display 136, handle 128, weight sensor 206, lighting element 140, proximity sensor 142, omnidirectional imaging system 134, basket 126, and other such elements. The cart 300 includes a interface unit 304 that removably couples to the cart 300 adjacent the handle 128. In some examples the interface unit 304 may not be removable 304, but may instead be a separate unit from the cart 300 that may be implemented in different environments, such as on a cart 300, on a table, at a checkout station, or other such locations. The interface unit 304 includes the omnidirectional imaging system 134, display 136, proximity sensor 142, and weight sensor(s) 306. In some standalone units, the interface unit 304 may include a power supply to receive power from a power supply of the facility, such as AC power. The interface unit 304 may also include a handheld scanner or lighting element in some examples. The interface unit 304 may be removed from the cart 304 to take to a location, such as a produce section of a grocery store, to provide a mobile weight station for the user to weigh produce for adding to the cart 104 and the virtual cart. The weight sensor 306 may include a scale on which items may be placed to weigh them. The interface unit 304 may be used when connected to the cart 104, for example to weigh items such as produce brought to the cart 104.

In some examples, the interface unit 304 may include lighting elements such as lighting element 140 that may illuminate to indicate the weight sensor 306 is active. In some examples, the weight sensor 306 may activate in response to the imaging system 134 gathering image data and the cart 104 subsequently determining that the user is bringing an item to the cart 104 that needs to be weighed. In some examples, the weight sensor 206 of the basket 126 may similarly activate in response to determining that an item needs to be weighed. For example, the weight sensor 206 may tare or reset a weight value before the item is placed in the cart 104 such that the item is weighed by placing it in the cart 104. In some examples, the weight sensor may tare or zero out after a predetermined period of time following an item being placed in the cart 104. In this manner, a weight of each item placed in the cart 104 may be determined and used to add the item weight to the virtual cart, verify a quantity or identity of the item, or other such uses.

Figure 4B:
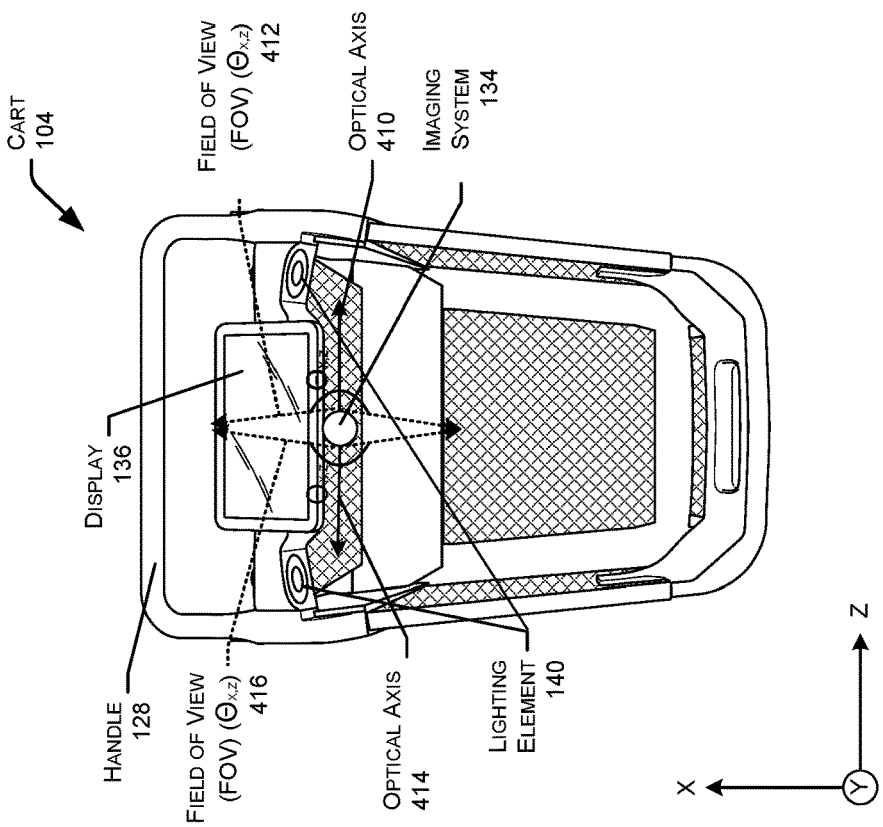
FIGS. 4A-4B illustrate example views of an item-identifying cart with an omnidirectional camera for observing environments and identifying items placed in the cart, according to at least one example.
Figure 4A:
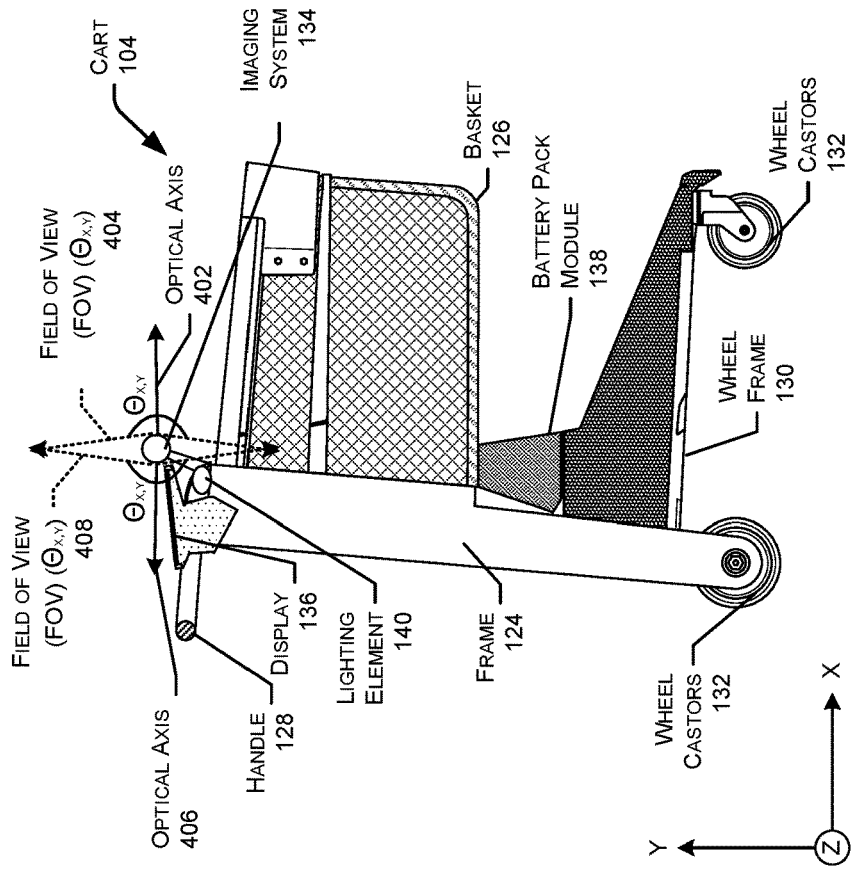

FIGS. 4A-4B illustrate example views of an item-identifying cart 104 with an omnidirectional imaging system 134 for observing environments and identifying items placed in the cart as well as events surrounding the cart 104, according to at least one example. The cart 104 may include the elements described above with respect to cart 104. As illustrated, the cross-section of the cart 104 is taken along a plane defined by the x-axis and y-axis along the center of the cart 104 from the back to the front of the cart 104.

In some examples, the imaging system 134 is positioned adjacent the handle 128 near the back of the cart 104. The imaging system 134 may include a first wide angle imaging device and a second wide angle imaging device to cover a field of view surrounding the cart 104. In an example, the imaging system 134 may have a first optical axis 402 and an FOV 404 oriented along the x-y plane, the first optical axis 402 may correspond to a first wide angle camera device of the imaging system 134. The first optical axis 402 of the imaging system 134 may be directed forward towards a front of the cart 104. The imaging system 134 may also have a second optical axis 406 and an FOV 408 also oriented along the x-y plane, with the second optical axis 406 corresponding to a second wide angle camera device of the imaging system 134. Though depicted with the first optical axis 402 and the second optical axis 406 along the x-y plane and directed towards the front and rear of the cart 104, the first optical axis 402 and the second optical axis 406 may be along other planes and directed in other directions. The FOV 404 associated with the first optical axis 402 may exceed one hundred and eighty degrees in some examples, such that the FOV 404 and the FOV 408 overlap at least partially. The FOV 408 may similarly exceed one hundred and eighty degrees in some examples. The imaging system 134 may include a layout such as shown and described with respect to FIGS. 5 and 6 below to provide an omnidirectional view in and around the cart 104. Other configurations of image sensors may be implemented to provide an omnidirectional view and omnidirectional image data in and around the cart 104.

The optical axes 402 and 406, as well as the optical axes of FIG. 4B, discussed below, may be parallel with a supporting surface as shown. In some examples, the optical axes 402 and 406 may be tilted and at an angle relative to a supporting surface. For example, the optical axis 406 may be tilted upwards towards an anticipated location of a face of a user in order to facilitate gaze tracking of the user to identify items the user is observing and spending time looking at while shopping. Such gaze tracking data may be stored as an interaction, even though the user has not physically interacted with the item. The optical axis 402 may be tiled downward toward the basket 126, to provide a better view of the basket 126 and its contents.

FIG. 4B illustrates an example top view of an item-identifying cart 104 that has omnidirectional imaging system 134 for identifying items 106 placed in the cart 104 as well as identify users and items around the cart 104. As illustrated, the cart 104 is shown from a top such that the dimensions of the cart 104 are illustrated along an x-axis and a z-axis (x-z coordinate plane).

In some examples, the imaging system 134 is positioned adjacent the handle 128 and the display 136. The imaging system 134 may include a first optical axis 410 and a second optical axis 414. As described above, the first optical axis 410 and the second optical axis 414 are shown directed in a first direction and a second direction, the second direction opposite the first direction. The optical axes may be directed in other directions so long as the FOV 412 and FOV 416 provide an omnidirectional view, the omnidirectional view providing a single view of the surroundings, and may provide up to a three hundred and sixty degree view in and around the cart 104 or more than two hundred and seventy degrees of view between the FOV 412 and the FOV 416. Generally, the FOVs 412 and 416 may overlap at the front and rear of the cart 104. The FOVs 412 and 416 may, in combination, cover all, or most, of the interior of the perimeter of the basket 126 as well as covering all or most of the environment surrounding the cart 104 in a single view.

In some examples, the single view provided by the imaging system 134 may provide a higher pixel count at a lateral side of the cart, aligned with the optical axes 410 and 414, than at a front or rear side of the cart. As most interactions with items by the user and items being brought to the cart are likely to approach from the sides, the increased pixel count may improve a scan experience by enabling easier scanning of items as they are placed in the cart. In some examples, such as in FIG. 4A, the pixel count at the front and rear, aligned with optical axes 402 and 406, of the cart may be higher than at the sides, providing an enhanced view into the cart.

In some examples, the imaging system 134 may include one or more imaging devices, such as directed along the different optical axes. In some examples, the omnidirectional view may be provided through the use of one or more mirrors, to provide a single view of the surrounding environment around the cart 104. In some examples, the imaging system 134 may include multiple imaging devices, such as depicted below. In such examples, the imaging devices may be placed adjacent one another, such that a distance between the imaging devices is minimized, as much as possible, based on hardware limitations. In some examples, the distance between imaging devices of the imaging system 134 may be less than three inches, to provide a more unified single omnidirectional view of the surrounding environment, which may include overlapping fields of view from different imaging devices. In some examples the imaging system 134 may include a stereo camera system that may be used to provide proximity sensor data, while also providing omnidirectional image data as described herein. For example, the imaging devices may be placed more than three inches apart, and may be placed on opposite lateral sides of the display 136 or of the cart 104.

Figure 5:
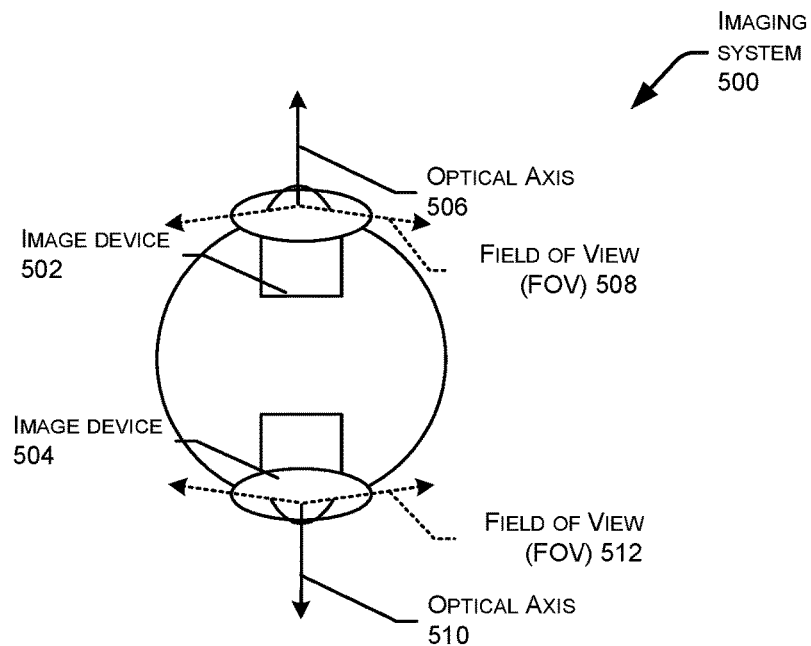
FIG. 5 illustrates an example layout of image devices for an omnidirectional image system, according to at least one example.

FIG. 5 illustrates an example layout of an omnidirectional imaging system 500, according to at least one example. The omnidirectional imaging system 500 may be a simplified block diagram illustrating a potential layout of image sensors within the imaging system 500. The imaging system 500 may be an example of the omnidirectional imaging system 134. The imaging system 500 includes a first image device 502 and a second image device 504. The first image device 502 and the second image device 504 may include any suitable image device to gather image data of item identifiers, users, environment, or other image data (e.g., an image sensor such as a camera, photodetector, or other sensing apparatus designed to read a one or two-dimensional barcode or gather one or two-dimensional image data).

The first image device 502 is pointed in a first direction, along the first optical axis 506. The first optical axis 506 may represent a center of the FOV 508 of the first image device 502. The first image device 502 may be a wide angle camera, such as equipped with a fisheye lens or other such image device having a FOV 508 of over one hundred and eighty degrees. In some examples the FOV 508 may be less than one hundred and eighty degrees or may be one hundred and eighty degrees. The second image device 504 is pointed in a second direction, along the second optical axis 510. The second optical axis 510 may represent a center of the FOV 512 of the second image device 504. The second image device 504 may be a wide angle camera, such as equipped with a fisheye lens or other such image device having a FOV 512 of over one hundred and eighty degrees. In some examples the FOV 512 may be less than one hundred and eighty degrees or may be one hundred and eighty degrees.

The second direction may be opposite the first direction, e.g., one hundred and eighty degrees from the first direction. In some examples the first direction and the second direction may be along a single axis in opposite directions. In some examples, the first direction and the second direction may be along different axes, but directed in different directions such that the FOV 508 and the FOV 512 cover all or most of the surrounding environment.

In some examples, the imaging system 500, and imaging system 600 discussed below, may be housed within a single housing having a diameter of less than three inches, with the imaging devices in a compact housing and positioned near each other such that the omnidirectional view captures the majority of the surroundings of the imaging system 500, including inside the cart 104 as well as around the cart 104. In some examples, the imaging system 500 may surround, within the circle, the display 136 or the width of the cart, for example with the image devices 502 and 504 placed on opposing sides of the display 136 or of the cart 104. Additionally, the imaging system 500 may include a lighting system as discussed above to provide illumination for image capture and may also include a proximity sensor that may be used to trigger the lighting system as discussed above.

Figure 6:
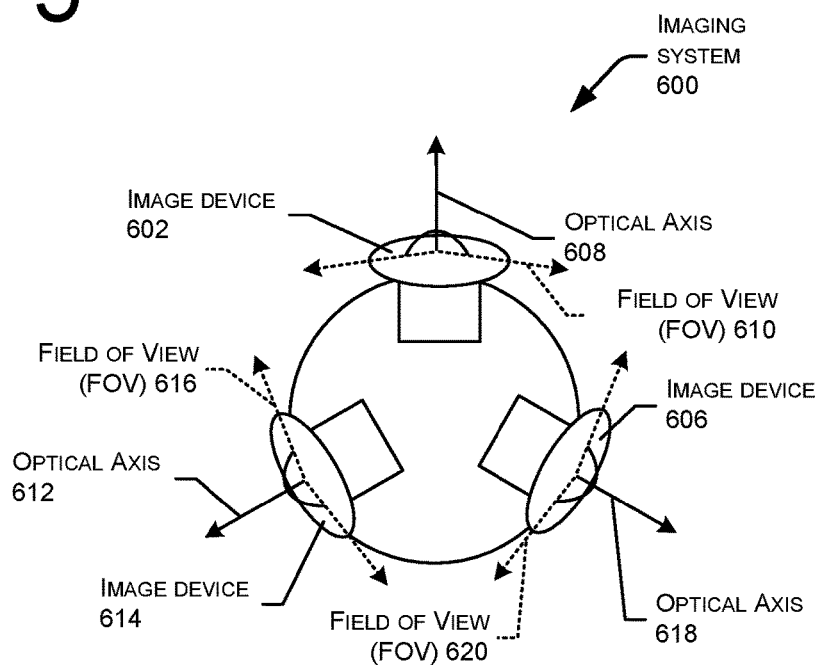
FIG. 6 illustrates an example layout of image devices for an omnidirectional image system, according to at least one example.

FIG. 6 illustrates an example layout of an omnidirectional imaging system 600, according to at least one example. The omnidirectional imaging system 600 may be a simplified block diagram illustrating a potential layout of image sensors within the imaging system 600. The imaging system 600 may be an example of the omnidirectional imaging system 134. The imaging system 600 includes a first image device 606, a second image device 614, and a third image device 614. The first image device 602, the second image device 606, and the third image device 614 may include any suitable image device to gather image data of item identifiers, users, environment, or other image data (e.g., an image sensor such as a camera, photodetector, or other sensing apparatus designed to read a one or two-dimensional barcode or gather one or two-dimensional image data).

The FOVs 610, 616, and 620 may overlap to provide coverage of the surrounding environment. As described above with respect to FIG. 5, the image devices 602, 606, and 614 have optical axes 608, 612, and 618, respectively. The optical axes 608, 612, and 612 may be spaced around the imaging system 600 evenly, for example at one hundred and twenty degree intervals. In some examples, the FOVs 610, 616, and 620 may be less than one hundred and eighty degrees, and may be significantly less than that described above with respect to imaging system 500, for example with each FOV 610, 616, and 620 being in a range of about one hundred and twenty degrees. In some examples the FOVs 610, 616, and 620 may be greater than or less than one hundred and twenty degrees.

Figure 7:
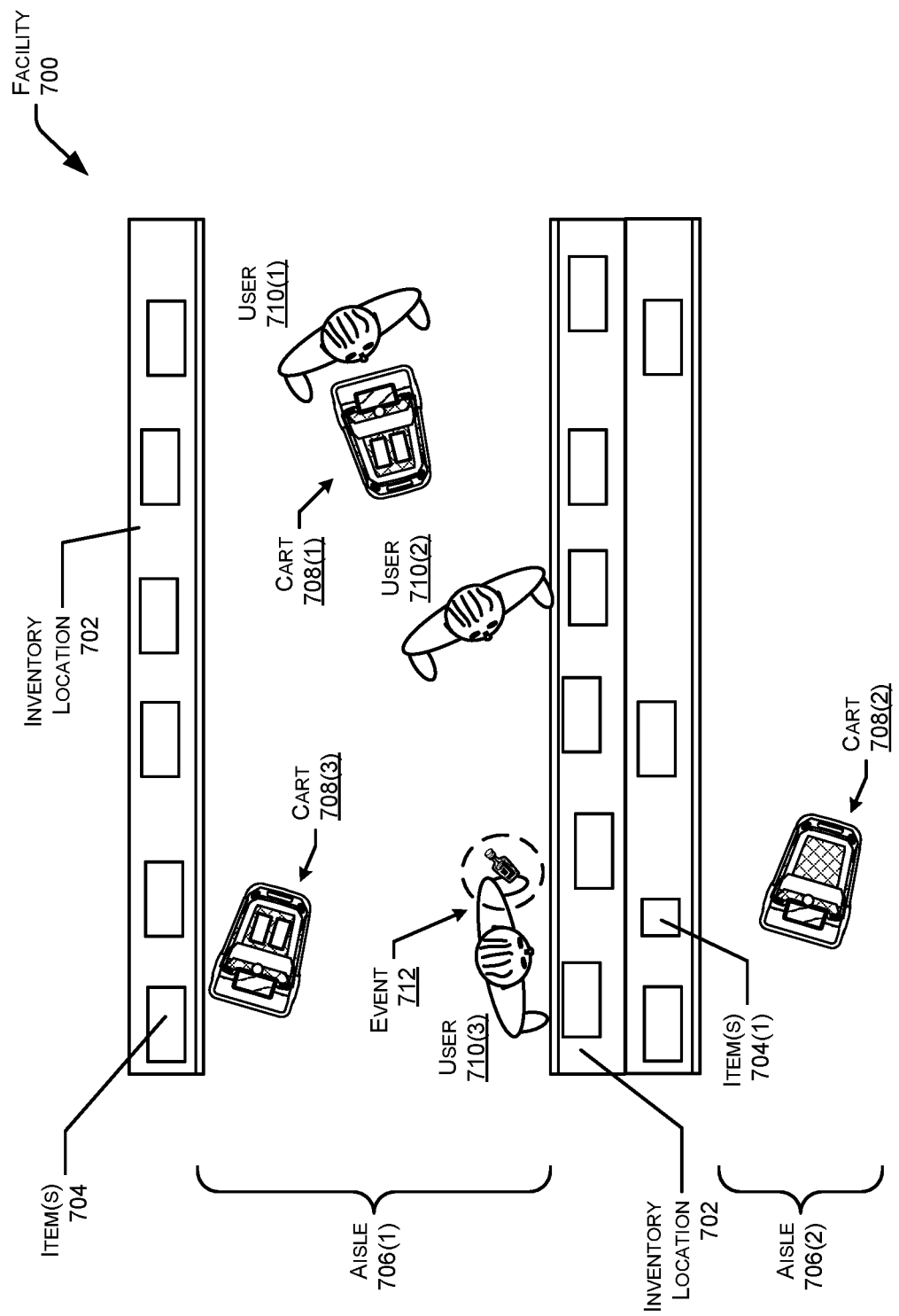
FIG. 7 illustrates an example of a materials handling facility where a fleet of carts may be implemented cooperatively, according to at least one example.

FIG. 7 illustrates an example of a materials handling facility 700 where a fleet of carts may 708 be implemented cooperatively, according to at least one example. The facility 700 may be an example of a facility 102 as described with respect to FIG. 1 or facility 1102 of FIG. 11. The facility 700 may have inventory locations 702 (e.g., storage shelves) with items 704 placed thereon. The inventory locations 702 defines aisles 706, with one or more inventory locations 702 defining one or more aisles 706. In the example shown, the facility 700 includes carts 708, which may be similar to cart 104 described above. The carts 708 may be equipped with omnidirectional imaging systems to view a surrounding environment of each cart 708. Each cart 708 is associated with a user 710, as described herein. The users 710 may push the cart 708 and in some examples may walk away from the cart 708 to retrieve items 704.

In the illustrated example, a first user 710(1) and a second user 710(3) may be in an aisle 706(1) interacting with items 704, such as to retrieve items 704 to place in their carts 708. The user 710(3) may interact with an item 704 at event 712. In this example, the user 710(3) may be observed by the imaging systems of the cart 708(3) and the cart 708(1). In such examples, the cart 708(3) associated with the user 710(3) may record the even 712. In some examples, the cart 708(1) may also recode data associated with the event 712. In some instances, the event 712 may be recorded in an event log, as described herein. The additional image data from additional carts 708 may provide further detail and information useful for identifying event 712, and items 704 interacted with by the user 708(3).

In some examples, the event 712 may include interactions other than placing in a cart 708. For example, the imaging systems of the carts may be used to track items that are returned to shelves, or gaze directions of users, to identify items that users interact with or observe before finally making a selection for purchase. Such information may be provided to the facility and may be used in designing a planogram for the facility 700 or providing information to item providers, such as indicative of what percent of users who stop to look at their products choose the providers product over a competitor product. The gaze tracking may be used to identify items of interest leading up to a selection by a user, providing insight into how users are interacting with shelves and displays within the facility 700.

In some examples, a user 708(2) may leave a first aisle 706(2) and go to a second aisle 706(1) out of view of the cart 710(2). In such examples, the cart 710(2) may not be able to identify an event or interaction of the user 710(2) with items 704. Additionally, the cart 710(2) may not be able to identify an origin of an item selected by the user 708(2). The origin of the item may be used for item identification as described herein and may be especially useful for determining an identity of an item in a produce setting, such as to differentiate between an organic item and a nonorganic item. In such examples, the carts 708(3) and 708(1) may gather image data that may be processed by the carts 708(1) and 708(3) or by a remote computing system to identify the user, without using personal identifying information, but instead relying on a tracklet or other manner of identifying the user 710(2) and associating with a cart. The image data associated with the user 710(2) may be transmitted to the cart 708(2) for storage in an event log and/or for updating a virtual cart with information relating to an item selected by the user 710(2).

In some examples, the carts 708 may be used to measure traffic within an aisle or location of a facility 700. The image data from the carts may identify other carts using QR codes or other identifiers on the carts, such as identifiers that reflect pulses of non-visible spectrum light that may be detected by the sensor array of the cart, to determine cart traffic throughout the facility 700. The cart traffic may be used to identify hot zones or particularly high traffic zones that may be adjusted in a facility planogram to account for the high volumes of traffic, thereby improving customer flow through the facility and reducing choke points at the high traffic locations.

Figure 8:
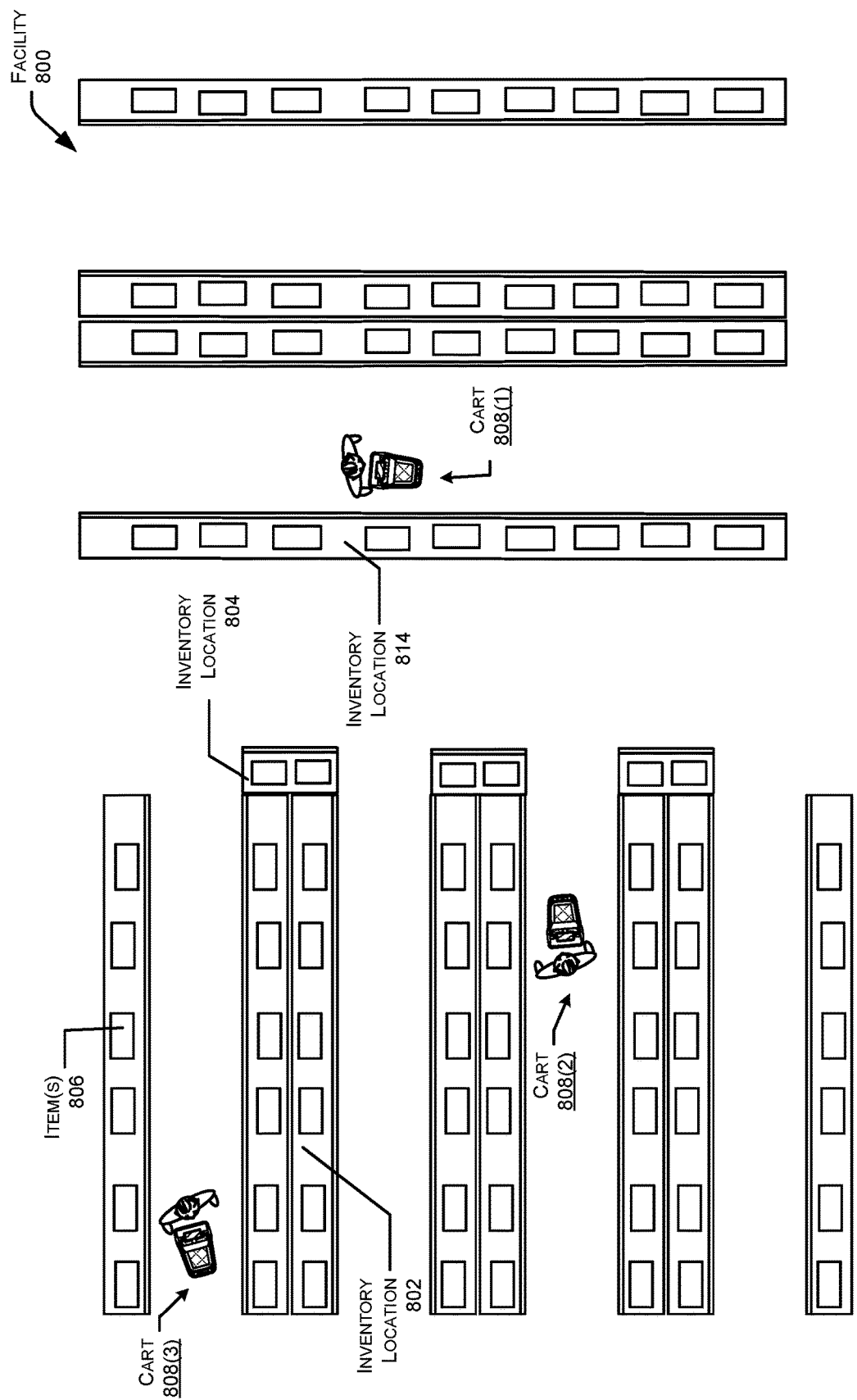
FIG. 8 illustrates an example of a materials handling facility where a fleet of carts may be implemented cooperatively, according to at least one example.

FIG. 8 illustrates an example of a materials handling facility where a fleet of carts 808 may be implemented cooperatively, according to at least one example. In some examples, the carts 808 may share image data and/or other data derived from image data with a remote computing system, such as server 120. For instance, the carts 808 may gather image data related to conditions within the facility 800, such as inventory levels, by identifying locations in the inventory locations 802 that are empty or vacant and communicating such information to the server 120. The server 120 may, in response, determine one or more inventory items that need to be restocked or refilled on the inventory locations 802.

In some examples, the carts 808 may gather image data relating to conditions within the facility, such as whether obstructions or obstacles are present in the aisles of the facility 800, or items 806 are out of place or disorganized within the facility 800. Such information may be transmitted to the server 120 and maybe used to generate a notification that an obstacle needs to be addressed by an associate or a particular area needs to be cleaned.

In some examples, the carts 808 may be used to generate a virtual layout of the facility 800 and update a virtual layout of the facility 800. Such a virtual layout (e.g., planogram) of the facility 800, may be used to identify locations of items 806 within the facility 800. In an example, the carts 808 may be pushed around the facility 800 during use by the users according to the techniques described herein. As the carts 808 are moved around the facility 800, the carts gather image data using omnidirectional imaging systems of entire surrounding environments at locations around the facility 800. The omnidirectional imaging may be transmitted to the server 120 in addition to location data in some examples for use in assembling a virtual layout of the facility 800. In some examples the image data may be conveyed to the server as a sequence of images that may be used to generate the virtual planogram by stitching the image data together without the use of location data, but based solely on image data. In this example, the virtual layout may be quickly and efficiently mapped virtually and updated with regularity using the carts 808 each time a user pushes a cart 808 around the facility 800. In some examples after the virtual layout is generated, the virtual layout may be updated with updated image data and item data that may be used to monitor conditions in the facility 800 as well as inventory of items on the shelves and items that should be restocked or replaced. In this manner, the facility 800 may update a virtual layout of the store without requiring manual input and updating of the planogram and also provides for near real-time updating of the layout.

Figure 9:
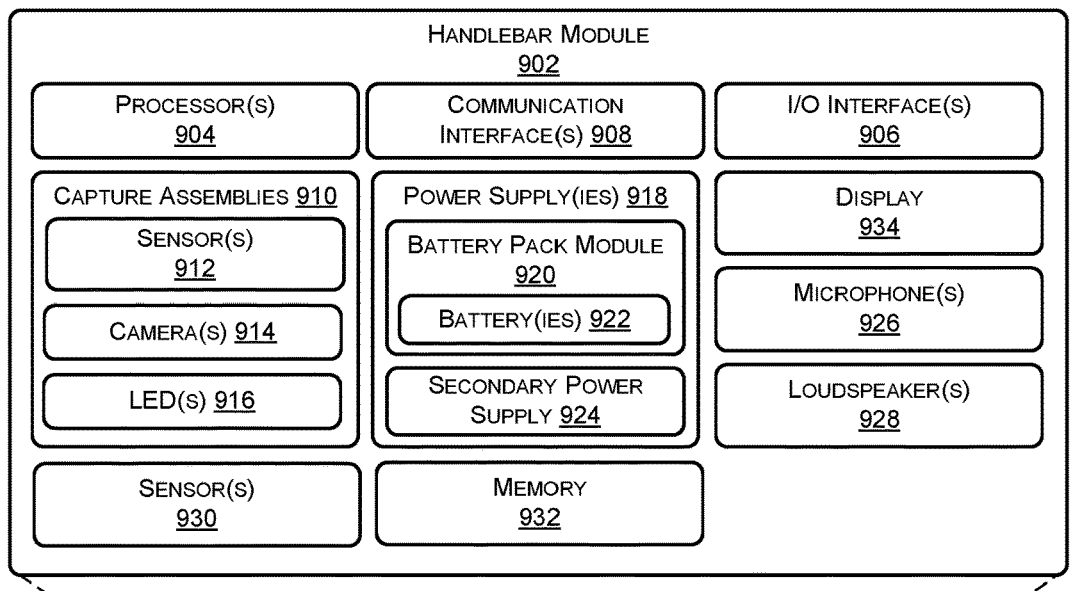
FIG. 9 illustrates an example of components of a handlebar module, in accordance with examples of the present disclosure.
Figure 9:
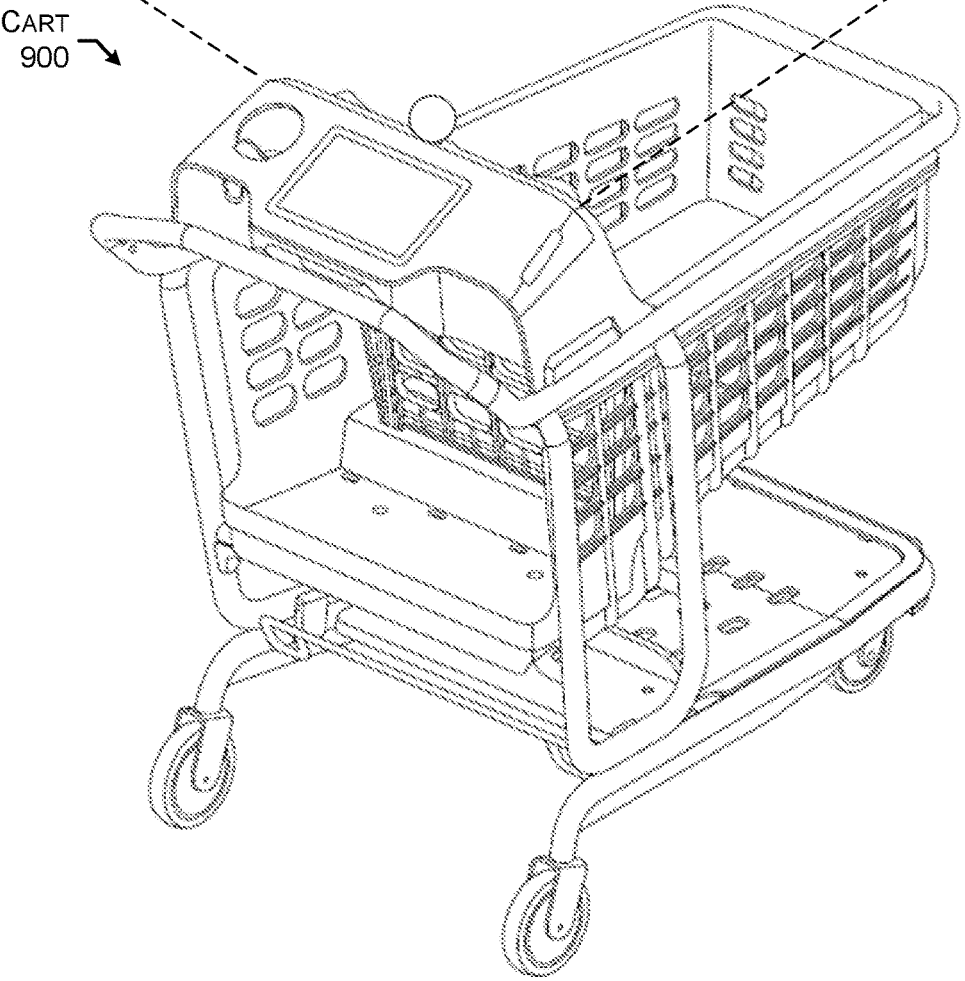

FIG. 9 illustrates example components of the handlebar module 902 configured to support at least a portion of the functionality of an item management system. The handlebar module 902 may include the interface unit 304. The handlebar module 902 may include one or more hardware processors 904 (processors) configured to execute one or more stored instructions. The processor(s) 904 may comprise one or more cores. The handlebar module 902 may include one or more input/output (I/O) interface(s) 906 to allow the processor(s) 904 or other portions of the handlebar module 902 to communicate with other devices. The I/O interface(s) 906 may comprise Inter-Integrated Circuit (I2C), Serial Peripheral Interface bus (SPI), Universal Serial Bus (USB) as promulgated by the USB Implementers Forum, and so forth. The I/O interface(s) 906 may allow the various modules/components to communicate with each other and/or control each other.

The handlebar module 902 may also include one or more communication interfaces 908. The communication interface(s) 908 are configured to provide communications between the handlebar module 902 and other devices, such as the server(s), sensors, interface devices, routers, and so forth. The communication interface(s) 908 may include devices configured to couple to personal area networks (PANs), wired and wireless local area networks (LANs), wired and wireless wide area networks (WANs), and so forth. For example, the communication interfaces 908 may include devices compatible with Ethernet, Wi-Fi™, and so forth. The handlebar module 902 may also include one or more busses or other internal communications hardware or software that allow for the transfer of data between the various modules and components of the handlebar module 902.

The handlebar module 902 may also include the one or more capture assemblies 910 that each include one or more sensors 912, an omnidirectional camera 914, and one or more LEDs 916. In some examples, the sensor(s) 912 may comprise any type of sensor that is able to detect the presence of nearby objects without the need for physical contact (e.g., ToF sensor(s), PIR sensor(s), capacitive sensor(s), etc.). The cameras 914 in each of the capture assemblies 910 may comprise any type of camera or imaging device configured to generate image data (and/or video data), or information descriptive of a plurality of picture elements or pixels. The LED(s) 916 may be selectively activated to emit light at any wavelength, visible or non-visible to users.

The handlebar module 902 may include one or more power supply(ies) 918 to provide power to the components of the handlebar module 902, such as a battery pack module 920, which include one or more batteries 922. The power supply(ies) 918 may also include a secondary (e.g., internal) power supply 924 to allow for hot swapping of battery pack modules 920, such as one or more capacitors, internal batteries, etc.

The handlebar module 902 may also include the display 934 (e.g., display 136) configured to display content represented by image data, such as pictures, videos, user interface elements, and/or any other image data. The display 934 may comprise any type of display 934, and may further be a touch screen to receive touch input from a user. The handlebar module 902 may also include one or more microphones 926 and one or more loudspeakers 928 to facilitate a dialogue with a user, and/or to receive feedback from the user. The microphone(s) 926 may capture sound representing the user's speech, and the loudspeaker(s) 928 may output machine-generated words to facilitate a dialogue, prompt a user for feedback on an item and/or for other information, and/or output other alerts or notifications.

The handlebar module 902 may also include other types of sensor(s) 930. As described herein, these sensor(s) may proximity sensor(s), light sensor(s), and/or the like.

The handlebar module 902 may include one or more memories 932 (e.g., in an electronics box module along with the processor(s) 904). The memory 932 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 932 provides storage of computer-readable instructions, data structures, program modules, and other data for the operation of the handlebar module 902.

Figure 10:
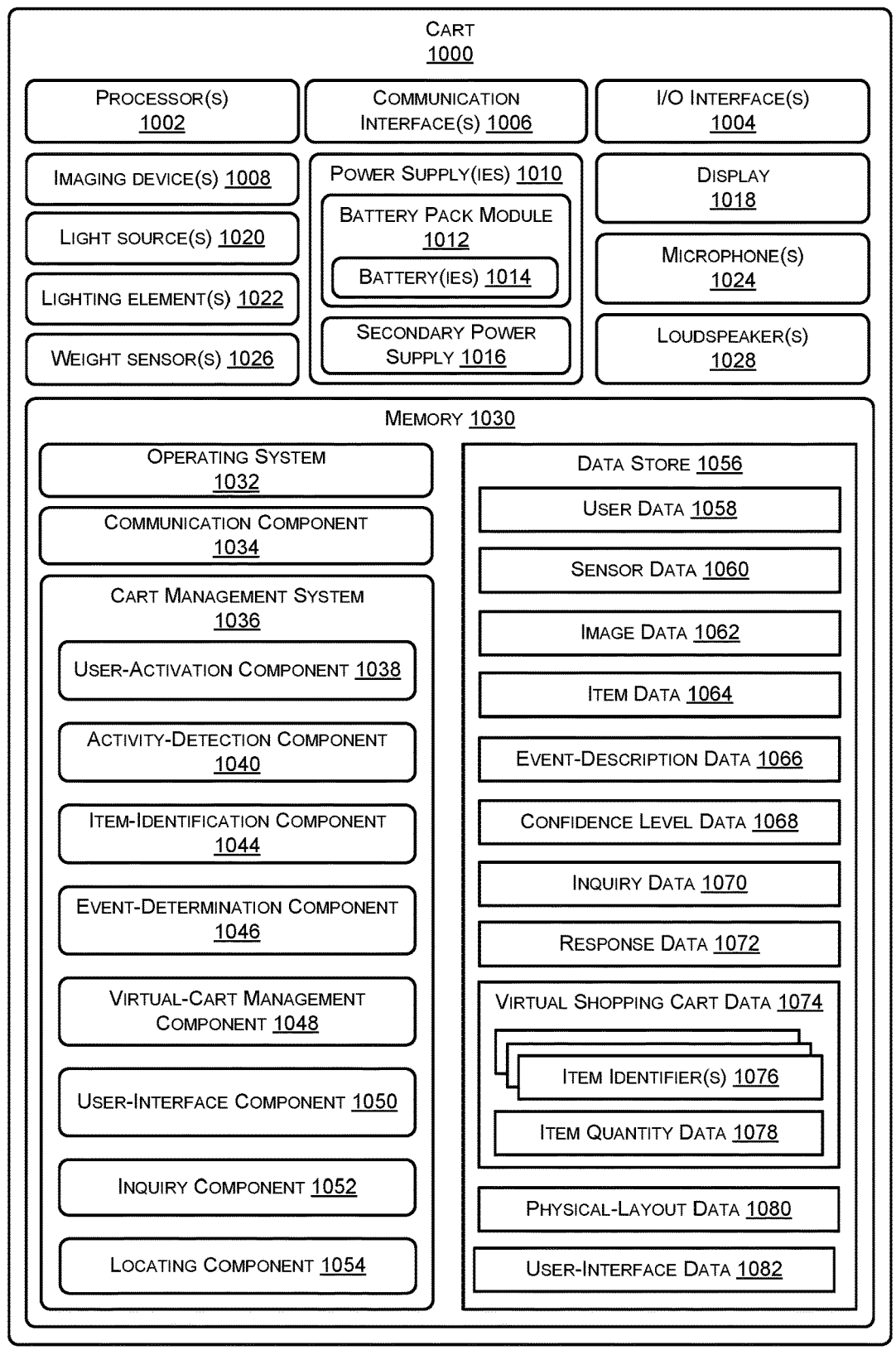
FIG. 10 illustrates example components of the mobile apparatus configured to support at least a portion of functionality of an item management system, in accordance with examples of the present disclosure.

FIG. 10 illustrates example components of an item-identifying cart 1000 (e.g., cart 104) configured to support at least a portion of the functionality of a cart management system.

The cart 1000 may include one or more hardware processors 1002 (processors) configured to execute one or more stored instructions. The processors 1002 may comprise one or more cores. The cart 1000 may include one or more input/output (I/O) interface(s) 1004 to allow the processor 1002 or other portions of the cart 1000 to communicate with other devices. The I/O interfaces 1004 may comprise Inter-Integrated Circuit (I2C), Serial Peripheral Interface bus (SPI), Universal Serial Bus (USB) as promulgated by the USB Implementers Forum, and so forth. The I/O interfaces 1004 may allow the various modules/components to communicate with each other and/or control each other.

The cart 1000 may also include one or more communication interfaces 1006. The communication interfaces 1006 are configured to provide communications between the cart 1000 and other devices, such as the server(s) 120, sensors, interface devices, routers, and so forth. The communication interfaces 1006 may include devices configured to couple to personal area networks (PANs), wired and wireless local area networks (LANs), wired and wireless wide area networks (WANs), and so forth. For example, the communication interfaces 1006 may include devices compatible with Ethernet, Wi-Fi™, and so forth. The cart 1000 may also include one or more busses or other internal communications hardware or software that allow for the transfer of data between the various modules and components of the cart 1000.

The cart 1000 may also include the imaging system 134. The cart 1000 may further include the the lighting elements 140, and the weight sensors 206 described above. In some instances, the cart 1000 further includes include one or more proximity sensors 142 comprising any type of sensor that is able to detect the presence of nearby objects without the need for physical contact (e.g., ToF sensors, PIR sensors, etc.). The imaging system, meanwhile, may comprise any type of camera or imaging device configured to generate image data (and/or video data) or information descriptive of a plurality of picture elements or pixels. Additionally, the imaging system 134 is outward-facing and generates image data representing the facility 102 around the cart 1000.

The cart 1000 may include one or more power supply(ies) 1010 to provide power to the components of the cart 1000, such as the battery pack module 138. The power supply(ies) 1010 may also include a secondary (e.g., internal) power supply to allow for hot swapping of battery pack modules 138, such as one or more capacitors, internal batteries, etc.

The cart 1000 may also include a display 136 configured to display image data, such as pictures, videos, user interface elements, and/or any other image data. The display 136 may comprise any type of display 136, and may further be a touch screen to receive touch input from a user 108. The cart 1000 may also include one or more microphones 1024 and one or more loudspeakers 1028 to facilitate a dialogue with a user 108, and/or to receive feedback from the user 108. The microphone(s) 1024 may capture sound representing the user's speech, and the loudspeaker(s) 1028 may output machine-generated words to facilitate a dialogue, prompt a user 108 for feedback on an item 106 and/or for other information, and/or output other alerts or notifications.

The cart 1000 may include one or more memories 1030 (e.g., in an electronics box module along with the processor(s) 1002). The memory 1030 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1030 provides storage of computer-readable instructions, data structures, program modules, and other data for the operation of the cart 1000. A few example functional modules are shown stored in the memory 1030, although the same functionality may alternatively be implemented in hardware, firmware, or as a system on a chip (SOC).

The memory 1030 may include at least one operating system (OS) component 1032. The OS component 1032 is configured to manage hardware resource devices such as the I/O interfaces 1004, the communication interfaces 1006, and provide various services to applications or components executing on the processors 1002. The OS component 1032 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1030. These components may be executed as foreground applications, background tasks, daemons, and so forth. A communication component 1034 may be configured to establish communications with one or more of the sensors, one or more of the servers 120, or other devices. The communications may be authenticated, encrypted, and so forth.

The memory 1030 may further store a cart management system 1036. The cart management system 1036 is configured to provide the item-identifying functions (and other functions) provided by the cart 1000 as described herein. For example, the cart management system 1036 may be configured to identify a user operating a cart, identify items 106 placed into the cart, identify events surrounding the cart 1000, and maintain a virtual shopping cart for a user 108 of the cart 1000. While these components are described as operating on the cart 1000, in some instances some or all of these components reside additionally or alternatively on the servers 120 or elsewhere.

The cart management system 1036 may include a user-activation component 1038 that performs operations for activating a shopping session using a cart 1000 on behalf of a user 108. For instance, a user 108 may have previously registered for a user account with an operator of the facility to utilize various automated management services provided by an operator of the facility 102. The user 108 may have registered for a user account, such as by providing user data 1058, to automate payments made for items taken by the user and included a payment means (e.g., credit card, bank account number, etc.), and may have also provided an identification means in the user data 1058 to the user-activation component 1038 such that the cart 1000 can recognize the user 108. For instance, the user 108 may have registered to identify themselves to the cart 1000 using any identification technique by the user-activation component 1038, such as by providing user data 1058 by presenting an identification means to the imaging system 134 (e.g., presenting a driver's license, presenting a facility-issued card, presenting a user identifier via a mobile phone, etc.), speaking a predefined utterance that is captured by the microphone(s) 1024 (e.g., a name of the user, a predefined keyword, etc.), and/or looking into the imaging system 134 for facial recognition. Once a user 108 has identified themselves to using the user-activation component 1038, the user-activation component 1038 may open a shopping session where the cart 1000 identifies and track items 106 retrieved by the user 108 and placed in the cart 1000 as well as user interaction in the environment of the facility.

The cart management system 1036 may additionally include an activity-detection component 1040 configured to detect items 106 (or objects) within a particular proximity to the cart. For example, one or more proximity sensor(s) (if present) may generate sensor data 1060 that indicates a distance between the proximity sensor(s) 142 and any objects located in the FOV of the proximity sensor(s). The activity-detection component 1040 may analyze the sensor data 1060 and determine if an object is within a threshold distance indicating that the object is near the cart 1000 and/or within or near the perimeter of the top of the basket 126 of the cart 1000 (e.g., one foot from the proximity sensor(s), two feet from the proximity sensor(s), etc.). In this way, the proximity sensor(s) may generate sensor data 1060 that indicates whether or not an item 106 is being moved in or out of the basket 126 of the cart 1000. However, in some examples, rather than using sensor data 1060 generated by a proximity sensor(s), the activity detection component 1040 may utilize image data 1062 generated by the imaging system 134 to determine if an object is within a threshold distance from the cart 1000.

The cart management system 1036 may also include an item-identification component 1044 configured to analyze image data 1062 to identify an item 106 represented in the image data 1062. The image data 1062 may comprise information descriptive of a plurality of picture elements, or pixels, for one or more image frames (e.g., a still picture, multiple picture frames, video frames, etc.). The item-identification component 1044 may analyze the image data 1062 using various image processing techniques, or computer vision techniques. For instance, the item-identification component 1044 may extract a representation of an item 106 depicted in the image data 1062 generated by the imaging system 134. The representation may include identifying text printed on the item 106, colors or color schemes printed in the item, determining 2-D and/or 3D shapes of the items 106, and/or other techniques for extract a representation of the item 106. In some instances, the representation of the item 106 depicted in the image data 1062 may comprise a numeric representation, such as a feature vector or a set of feature vectors.

In some examples, a data store 1056 stored in the memory 1030 may include item data 1064, which may include representations of the items 106 offered for acquisition at the facility 102. The item-identification component 1044 may compare the extracted represented of the item 106 with the "gallery" or stored representations of the known items 106 in the item data 1064. In some instance, the item representation may include an indication of a barcode or SKU data for the item 106 as recognized in, or extracted from, the image data 1062. The item-identification component 1044 may determine confidence level data 1068 based on the comparisons with item representation in the item data 1064. The item-identification component 1044 may determine, and assign, confidence levels indicating how likely it is that the item 106 represented in the image data 1062 corresponds to an item from the item gallery in the item data 1064. Based on the confidence level data 1068, the item-identification component 1044 may determine an item identifier 1076 for the item in the image data 1062 (or multiple item identifiers 1076) that corresponds to an item in the item data 1064 to which the item 106 corresponds.

In some examples, the data store 1056 may include physical-layout data 1080 that is used by the item-identification component 1044 to determine the item 106. The physical-layout data 1080 may include or provide a mapping of physical locations within the physical layout of devices and objects such that the location of the cart 1000 may be utilized to determine an item 106 stored nearby. The physical-layout data 1080 may indicate the coordinates within the facility 102 of an inventory location 112, items 106 stored at that inventory location 112, and so forth. In examples where the cart 1000 has location determining sensors (e.g., GPS, RFID, proximity, etc.), the location sensor data may be used to determine where in the store the user 108 is. In such examples, the item-identification component 1044 may access the physical-layout data 1080 to determine if a location associated with the event is associated with items 106, and confidence levels for the corresponding representations of items in the item data 1064. Continuing the example above, given the location within the facility 102 of the event and image camera data, the physical-layout data 1080 may determine the items 106 that may have been represented in generated images of the event 110.

The cart management system 1036 may further include an event-determination component 1046 to determine event-description data 1066 for the item 106 in the image data 1062. The event-determination component 1046 may determine if the user 108 is adding an item 106 to the cart 1000, removing the item from the cart 1000, or other events as described herein etc., based on movement of the item 106 and/or whether the item is shown in the image data 1062. For instance, if the item 106 is shown as being moved downward towards the interior of the cart 1000, and the user's hand 108 then leaves the basket without the item, 106 it can be determined that the user 108 added the item 106 to the cart 1000. Similarly, if the user's hand 108 moves into the cart without an item 106 and is depicted in the image data 1062 taking an item 106 from the cart, the event-determination component 1046 may determine that the user 108 removed an item 106 from the cart 1000. Similarly, if the user 108 interacts with an item on a shelf or location in the environment, the event-determination component may determine that the user 108 has selected an item and may likewise determine when an item is returned to the shelf.

The cart management system 1036 may also include a virtual-cart management component 1048 configured to manage virtual shopping cart data 1074 for the cart 1000. For instance, the virtual-cart management component 1048 may utilize the item data 1064, event-description data 1066, and confidence level data 1068 to add item identifier(s) 1076 to the virtual shopping cart data 1074 for items 106 that were added to the cart 1000, remove item identifier(s) 1076 from the virtual shopping cart data 1074 for items 106 that were removed from the cart 1000, and track item quantity data 1078 indicating quantities of particular items 106 in the cart 1000.

The cart management system 1036 may further include a user-interface component 1050 configured to present user interfaces on the display 136 based on user-interface data 1082. The user interfaces 1082 may include one or more fields to present data, and/or receive touch input (or other input via a keyboard, mouse, etc.) from a user 108. For instance, if the item-identification component 1044 is unable to determine an item identifier 1076 for an item 106 shown in the image data 1062, the user-interface component 1050 may receive inquiry data 1070 generated by an inquiry component 1052 to prompt a user 108 for feedback to help identify the item 106, and/or other information (e.g., if multiple items were placed in the cart 1000). The inquiry component 1052 may be configured to generate inquiry data 1070 based on the information needed to identify the item 106. For instance, the inquiry data 1070 may include a prompt to request particular feedback from the user 108, such as to provide input (e.g., touch input, vocal/utterance input, etc.) to identify the item 106, input to indicate how many items 106 were added to the cart, input to indicate whether an item 106 was removed or added, etc. In some examples, the user-interface component 1050 may present one or more images depicting items from the item data 1064 that have the highest confidence levels as corresponding tot eh item 106 in the image data 1062, but confidence levels that are not high enough to make a final decision as to the item 106. For instance, the user-interface component 1050 may present pictures of two different items that have high confidence levels 1068 and request that the user 108 select or indicate the appropriate item 106. Additionally, or alternatively, the user-interface component 1050 may present user-interface data 1082 that prompts the user for feedback regarding whether or not the item 106 was added to, or removed from the cart 1000.

In some examples, the cart management system 1036 may further include a locating component 1054 configured to determine locations of the cart 1000 in the facility 102. For instance, the locating component 1054 may analyze sensor data 1060 collected by sensors of the cart 1000 to determine a location. In some examples, the communication interface(s) 1006 may include network interfaces that configured the cart 1000 to receive or detect wireless signals (e.g., WiFi signals, Bluetooth signals, etc.) and generate sensor data 1060 indicative of the signals. The locating component 1054 may analyze the sensor data 1060 using various techniques to identify the location of the cart 1000, such as WiFi triangulation, received signal strength indicators (RSSI), and/or other methods for analyzing wireless signals to determine a location of the cart 1000. In some instances, the facility 102 may include various infrared (IR) or near-IR emitters at different locations that emit light according to frequencies, patterns, etc. that indicate the different locations in the facility 102. In such examples, the cart 1000 may include a light sensor to generate the sensor data 1060 representing the IR or NIR and determine the location of the cart 1000 in the facility. In some instances, there may be visible landmarks or markers throughout the facility that indicate a location in the facility, and the locating component 1054 may analyze image data 1062 generated by an outward facing camera to determine a location of the cart 1000. As another example, there may be various radio frequency (RF) emitters positioned throughout the store, and the cart 1000 may include an RF receiver to allow the locating component 1054 to perform IR beaconing to determine the location of the cart 1000. The locating component 1054 may perform one, or any combination, of the above techniques to determine a location of the cart 1000 in the facility and/or any other technique known in the art.

The locating component 1054 may perform various operations based on determining the location of the cart 1000 within the facility 102. For instance, the locating component 1054 may cause user interface data 1082 to be presented on the display 136 that includes a map of the facility 102 and/or directions to an item 106 for the user of the cart 1000. Additionally, or alternatively, the locating component 1054 may utilize the location of the cart, the physical-layout data 1080, and/or item data 1064 and "push" user interfaces to the display 136 that indicate various location-based information, such as indications of deals for items 106 located nearby, indications of items 106 located nearby and on the user's shopping list, and/or other user interface data 1082.

Figure 11:
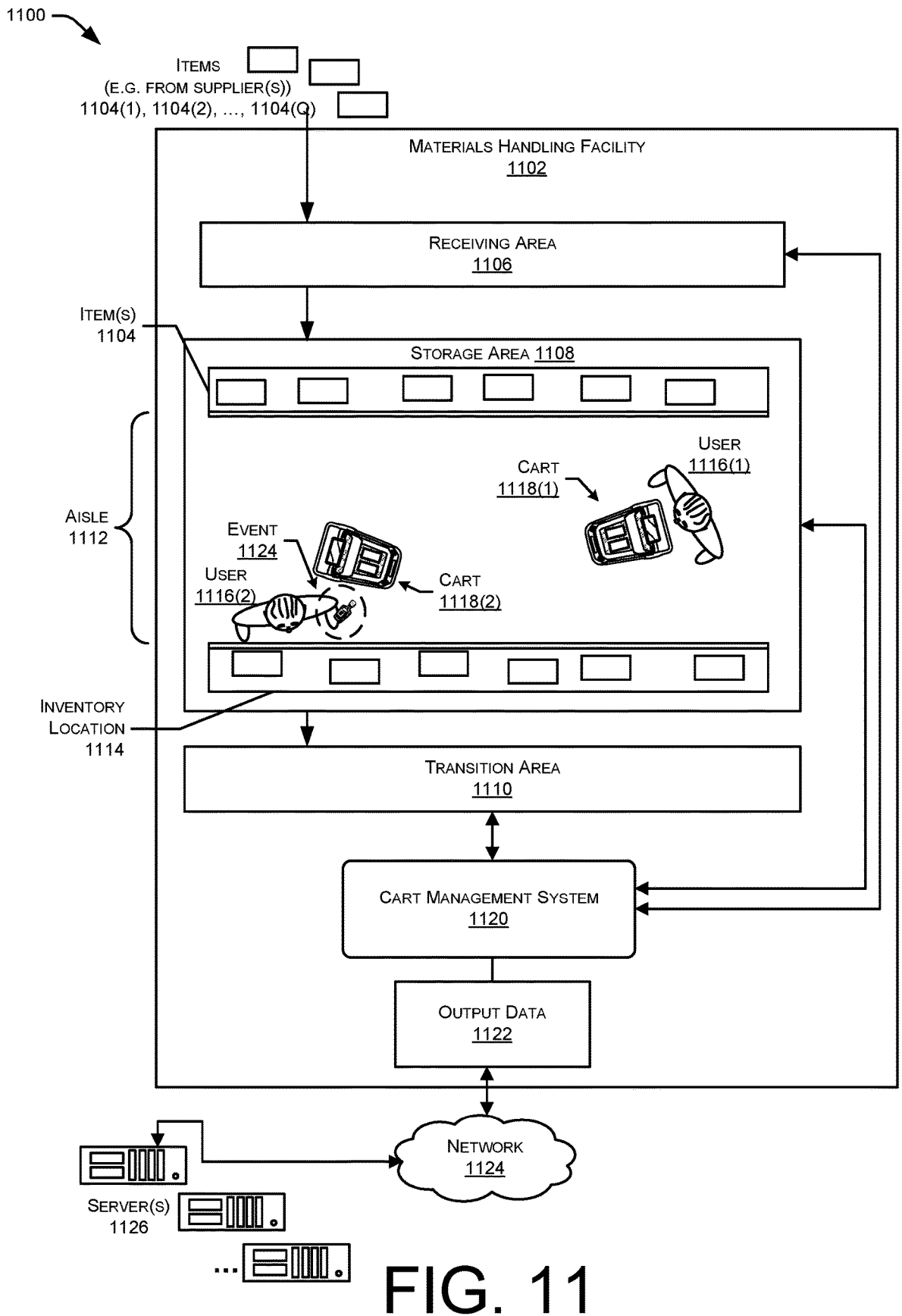
FIG. 11 is a block diagram of an example materials handling facility that includes item-identifying carts and a cart management system configured to generate output regarding events occurring in the cart using sensor data, according to at least one example.

FIG. 11 is a block diagram 1100 of an example materials handling facility 1102 (also referred to the "facility 1102") that includes carts and an item management system configured to generate output regarding events occurring in the cart using sensor data. However, the following description is merely one illustrative example of an industry and environment in which the techniques described herein may be utilized.

An example of the facility 1102 configured to store and manage inventory items is illustrated in FIG. 11. The facility 1102 comprises one or more physical structures or areas within which one or more items 1104(1), 1104(2), . . . , 1104(Q) (generally denoted as 1104) may be held. As used in this disclosure, letters in parenthesis such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one example, the storage area 1108 may include one or more aisles 1112. The aisles 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some examples, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), . . . , 1116(U), carts 1118(1), . . . , 1118(T) (generally denoted as 1118) or other material handling apparatus may move within the facility 1102. For example, the users 1116 may move about within the facility 1102 to pick or place the items 1104 in various inventory locations 1114, placing them on the carts 1118 for ease of transport. An individual cart 1118 is configured to carry or otherwise transport one or more items 1104. For example, a cart 1118 may include a basket, a cart, a bag, and so forth. In other examples, other agencies such as robots, forklifts, cranes, aerial drones, and so forth, may move about the facility 1102 picking, placing, or otherwise moving the items 1104.

One or more sensors may be configured to acquire information in the facility 1102. The sensors in the facility 1102 may include sensors fixed in the environment (e.g., ceiling-mounted cameras) or otherwise, such as sensors in the possession of users (e.g., mobile phones, tablets, etc.) or sensors mounted on the carts 1118. The sensors may include, but are not limited to, cameras, weight sensors (e.g., in the bottom of the carts 1118), radio frequency (RF) receivers, temperature sensors, humidity sensors, vibration sensors, and so forth. The sensors may be, in some examples, in or on the cart 1118 or another location in the facility 1102. In one example, the bottom of a basket of the carts 1118 may include weight sensors configured to determine a weight of the items 1104 placed thereupon.

During operation of the facility 1102, the sensors may be configured to provide information suitable for identifying the movement of items 1104 or other occurrences within the cart 1118. For example, a series of images acquired by a camera may indicate removal of an item 1104 from a particular cart 1118 by one of the users 1116 and/or placement of the item 1104 on or at least partially within one of the carts 1118.

While the storage area 1108 is depicted as having one or more aisles 1112, inventory locations 1114 storing the items 1104, sensors, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The carts 1118 and/or the inventory location 1114 may include, or be coupled to, an item management system 1120. The item management system 1120 is configured to identify interactions with and between users 1116, carts 1118, and/or the inventory location 1114, in one or more of the receiving area 1106, the storage area 1108, or the transition area 1110. These interactions may include one or more events 1124. For example, events 1124 may include placing of an item 1104 in a cart 1118, returning of an item 1104 from the cart 1118 to an inventory location 1114, placing an item 1104 on the inventory location 1114, removing an item 1104 from the inventory location 1114, and/or any of the other events described herein. Other events 1124 involving users 1116 may include the user 1116 providing authentication information in the facility 1102, using a computing device at the facility 1102 to authenticate identity to the item management system 1120, and so forth.

By determining the occurrence of one or more of the events 1124, the item management system 1120 may generate output data 1122. The output data 1122 comprises information about the event 1124. For example, where the event 1124 comprises an item 1104 being removed from, or placed in, a cart 1118, the output data 1122 may comprise an item identifier indicative of the particular item 1104 that was removed from, or placed in, the cart 1118, a quantity of the item 1104, a user identifier of a user that removed the item 1104, and/or other output data 1122.

The item management system 1120 may use one or more automated systems to generate the output data 1122. For example, an artificial neural network, one or more classifiers, or other automated machine learning techniques may be used to process the sensor data and/or image data from the one or more sensors to generate output data 1122. The automated systems may operate using probabilistic or non-probabilistic techniques. For example, the automated systems may use a Bayesian network. In another example, the automated systems may use support vector machines to generate the output data 1122 or the tentative results. The automated systems may generate confidence level data that provides information indicative of the accuracy or confidence that the output data 1122 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 145%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominately spherical. Based on the difference in shape (cube vs. sphere) from the adjacent items, and the correspondence in shape with the previously stored image of the perfume bottle item 1104(1) (cubical and cubical), the confidence level that the user 1116 has picked up the perfume bottle item 1104(1) is high.

In some situations, the automated techniques may be unable to generate output data 1122 with a confidence level above a threshold result. For example, the automated techniques may be unable to distinguish which item 1104 in large a group of items a user 1116 has picked up from the inventory location 1114 and placed in the cart 1118. In other situations, it may be desirable to provide human confirmation of the event 1124 or of the accuracy of the output data 1122. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors. The subset of the sensor data may include images that may show the item 1104 being placed in, or removed from, the cart 1118. The subset of the sensor data may also omit images from other cameras that did not have that item 1104 in the field of view. The field of view may comprise a portion of the scene in the cart 1118 that the camera is able to generate sensor/image data about.

Continuing the example, the subset of the sensor data may comprise a video clip acquired by one or more cameras having a field of view that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 11. Specifically, as illustrated in this example, items 1104 may be received from one or more suppliers, such as manufacturers, distributors, wholesalers, and so forth, at the receiving area 1106. In various examples, the items 1104 may include merchandise, commodities, perishables, or any suitable type of item 1104, depending on the nature of the enterprise that operates the facility 1102. The receiving of the items 1104 may comprise one or more events 1124 for which the item management system 1120 may generate output data 1122.

Upon being received from a supplier at receiving area 1106, the items 1104 may be prepared for storage. For example, items 1104 may be unpacked or otherwise rearranged. An inventory management system of the facility 1102 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some examples, like items 1104 may be stored or displayed together in the inventory locations 1114 such as in bins, on shelves, hanging from pegboards, and so forth. In this example, all items 1104 of a given kind are stored in one inventory location 1114. In other examples, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114.

When a customer order specifying one or more items 1104 is received, or as a user 1116 progresses through the facility 1102, the corresponding items 1104 may be selected or "picked" from the inventory locations 1114 containing those items 1104. In various examples, item picking may range from manual to completely automated picking. For example, in one example, a user 1116 may have a list of items 1104 they desire and may progress through the facility 1102 picking items 1104 from inventory locations 1114 within the storage area 1108, and placing those items 1104 into a cart 1118. In other examples, employees of the facility 1102 may pick items 1104 using written or electronic pick lists derived from customer orders. These picked items 1104 may be placed into the cart 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. Information about the transition may be maintained by the item management system 1120 using the output data 1122 associated with those events 1124.

In another example, if the items 1104 are departing the facility 1102 a list of the items 1104 may be used by the item management system 1120 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102.

The item management system 1120 may access or generate sensor data about the items 1104, the users 1116, the carts 1118, and so forth. The sensor data may be acquired by one or more of the sensors, data provided by other systems, and so forth. For example, the sensors may include cameras configured to acquire image data of items 1104 placed in the carts 1118. The image data may comprise still images, video, or a combination thereof. The image data may be processed by the item management system 1120 to determine an item identifier for the items 1104, a listing of items in the cart 1118 for a user 1116, and so forth. As used herein, the identity of the user of a cart 1118 may represent a unique identifier of the user (e.g., name, number associated with user, username, etc.), an identifier that distinguishes the user amongst other users being identified with the environment, or the like.

The item management system 1120, or systems coupled thereto, may be configured to identify the user 1116. In one example, this determination may comprise comparing sensor data with previously stored identity data. For example, the user 1116 may be identified by showing their face to a facial recognition system, by presenting a token carrying authentication credentials, providing a fingerprint, scanning a barcode or other type of unique identifier upon entering the facility, and so forth. Identity of the user 1116 may be determined before, during, or after entry to the facility 1102 and/or interaction with a cart 1118. Determination of the user's 1116 identity may comprise comparing sensor data associated with the user 1116 in the facility 1102 and/or with the cart 1118 to previously stored user data. In some examples, the output data 1122 may be transmitted over a network 1126 to server(s) 1128.

FIGS. 12-15 depict logical flow diagrams for processes that may be carried out using the systems described herein. In some examples, the steps depicted may be implemented in software executed by a processor, such as a processor of a cart 104 or of a server 120, or other computing device. Though the logical flow diagrams are shown in a particular order, the order of the processes may be different in some examples. The processes 1200, 1300, 1400, and 1500, as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, some or all of the processes 1200, 1300, 1400, and 1500 may be performed locally on the carts as described herein, and some or all of the processes may be performed at a remote computing system, such as a cloud computing system with which the carts are in network communication.

Figure 12:
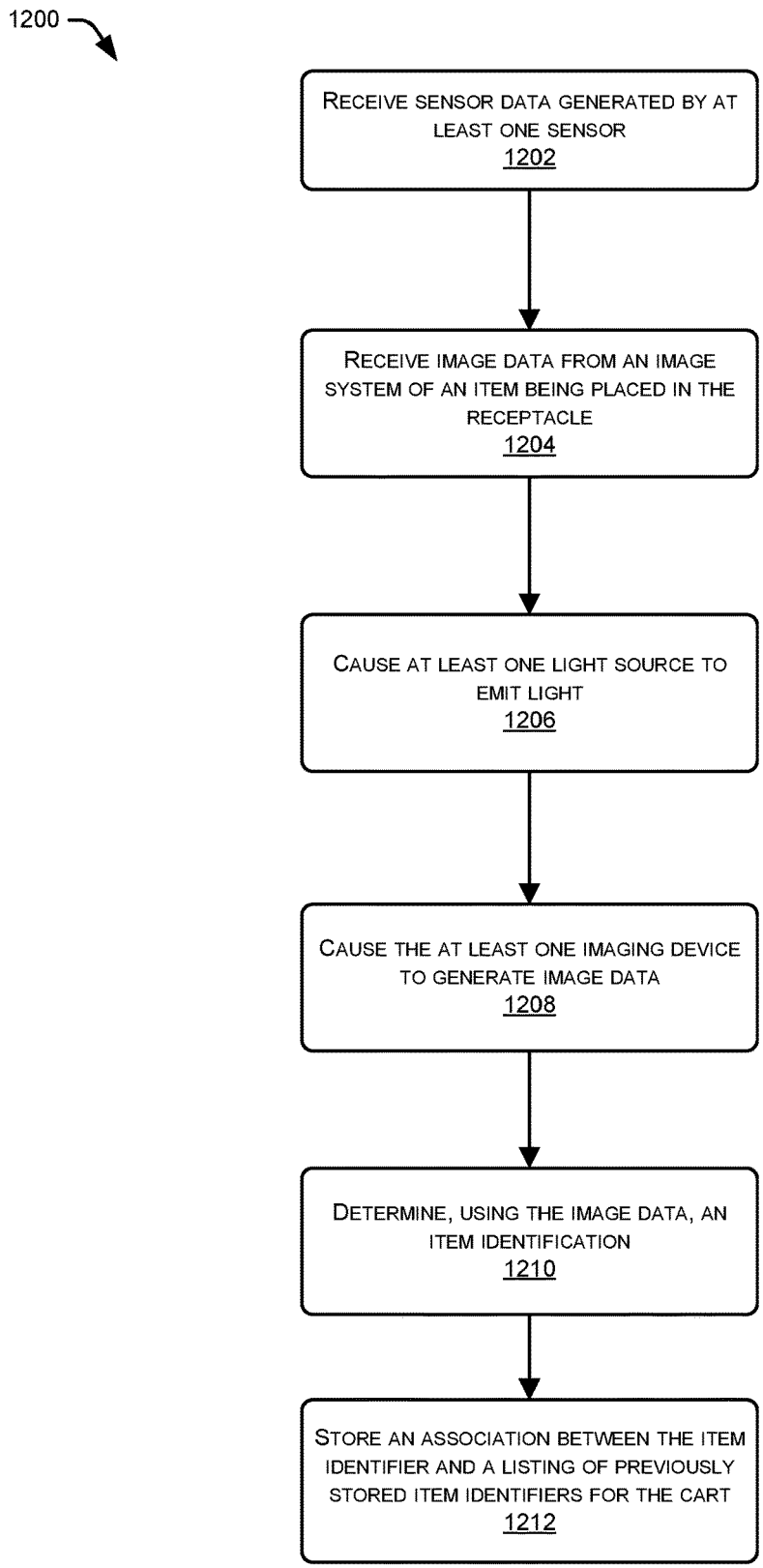
FIG. 12 illustrates a flow diagram of an example process for identifying items selected by a user and placed in a cart, according to at least one example.

FIG. 12 illustrates a flow diagram of an example process 1200 for identifying items selected by a user and placed in a cart, according to at least one example. At 1202, the processor of a cart 104, such as processor 904, may receive sensor data generated by at least one sensor. The at least one sensor may include a proximity sensor, an omnidirectional camera, depth sensor, or other such sensor. The sensor data indicative of a user interaction or an item being brought to the cart 104. The sensor data may include image data of an event as described herein.

At 1204, the process 1200 includes receiving image data from an image system, the image data indicative of an event or of an item being placed in a receptacle of a cart 104. The image data may be gathered by the omnidirectional imaging system 134. In some examples, the image data may be gathered in response to the sensor data received at 1202. In some examples, the image data may also include image data gathered from additional image systems, such as image systems built in to the facility, such as image systems attached to ceilings, shelves, at entrances and exits, and other such image data. Such image data may be used in conjunction with cart image data to identify customer interactions away from the cart as discussed above, such as items of interest before making a selection, or items selected but subsequently returned to a shelf.

At 1206, the process 1200 includes the processor causing a light source to emit light. The light may be caused to emit in response to proximity data or other sensor data, with the light used to illuminate an item at or near the cart 104 such that the imaging system may acquire clear image data fully illuminated. In some examples, the light source may be an indicator light used to indicate to the user whether the item should be placed on a scale or if the cart is ready for the item to be placed in the cart.

At 1208, the process 1200 includes the processor causing the imaging system to generate image data. The image data may be gathered while the light is illuminated to capture clear image data of the item at or near the cart.

At 1210, the process 1200 includes the processor determining, using the image data, and item identification. The item identification may be determined based on an item identifier visible in the image data, such as a QR code, barcode, or other such indicator. In some examples, the processor may identify the item using an image recognition, text recognition, or other such technique on the image data.

At 1212, the process 1200 includes the processor storing an association between the item identifier, such as the item identity, and a listing of items in a virtual cart associated with the user. The virtual cart may be verified in some instances based on a weight sensor that verifies a weight of the item placed in the cart and confirms the item weight matches a reference item weight for the item. The virtual list may be used to process an order for the user when they complete their interactions within the facility.

Figure 13:
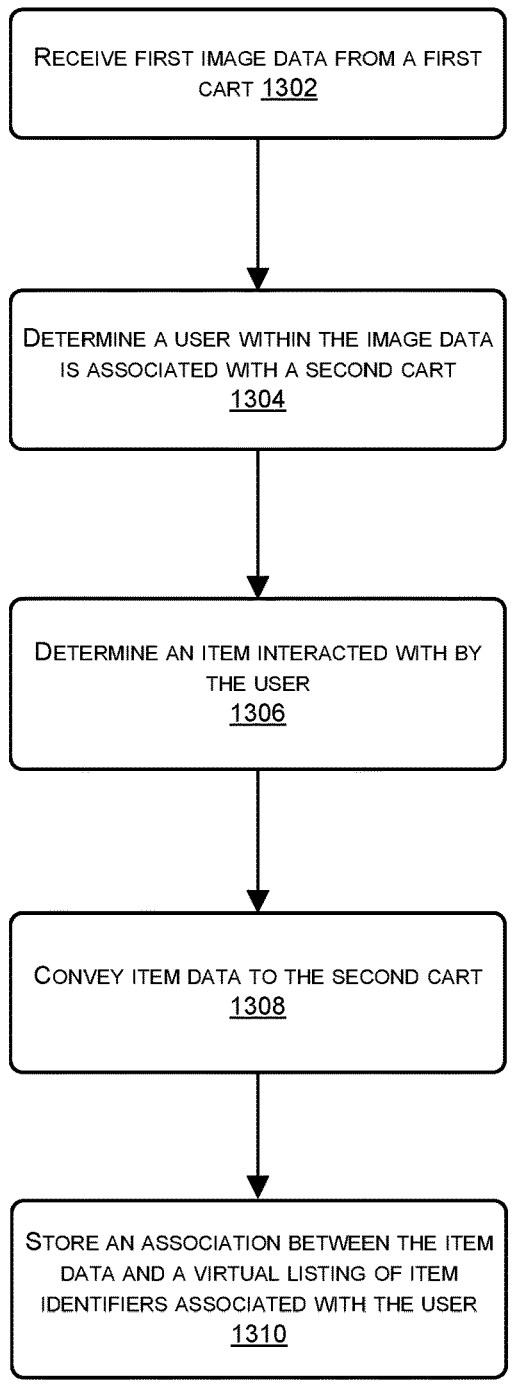
FIG. 13 illustrates a flow diagram of an example process for sharing image and item information between carts of a fleet, according to at least one example.

FIG. 13 illustrates a flow diagram of an example process 1300 for sharing image and item information between carts of a fleet, according to at least one example. At 1302, the process 1300 includes receiving first image data from a first cart. The image data may be gathered by an omnidirectional imaging system of a cart. The cart may be associated with the user or may be associated with a separate user other than the one identified in the image data. The image data may include an indication of an item interacted with by the user or other such event.

At 1304, the process 1300 includes determining the user within the image data is associated with a second cart. The user may be identified based on user identifying information, such as a user tracklet or other user-provided identifying information. The association with the cart may be based on a known identification through a central server of a facility that a unique identifier visible or detectable on the cart, is associated with a particular user visible in the image data.

At 1306, the process 1300 includes determining an item interacted with by the user. The item may be interacted with in a number of different ways including removing from a shelf, replacing on a shelf, moving to a cart, removing from the cart, or other such actions. The item may be identified as described herein based on an item identifier, item origin location, image recognition, or other such techniques.

At 1308, the process 1300 includes conveying item data to the second cart. The item data may include event data, such as what type of event occurred with the item. The second cart may receive data and information directly from the first cart or via a server of the facility.

At 1310, the process 1300 includes storing an association between the item data and the virtual listing of item identifiers associated with the user. As described herein, the virtual listing may include a virtual cart and/or an event log of events and items interacted with by the user, including items placed in a cart for purchase.

Figure 14:
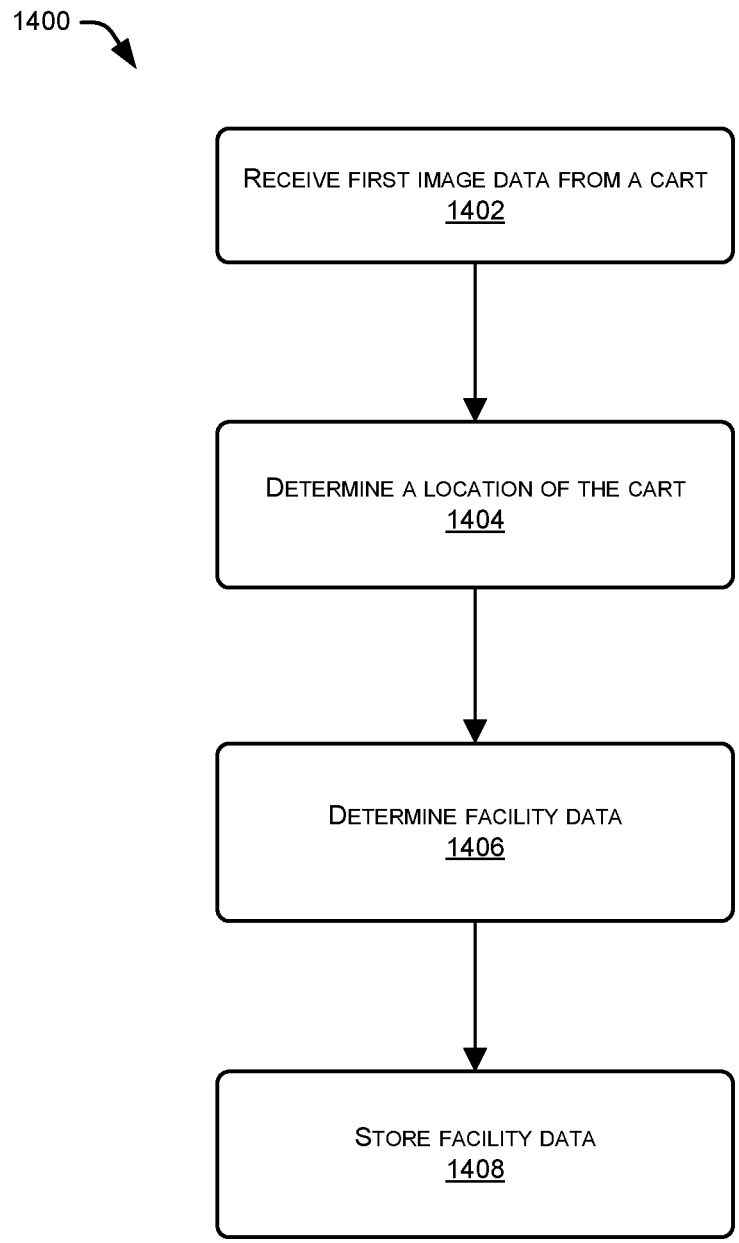
FIG. 14 illustrates a flow diagram of an example process for updating facility data using a fleet of carts with omnidirectional image systems, according to at least one example.

FIG. 14 illustrates a flow diagram of an example process 1400 for updating facility data using a fleet of carts with omnidirectional image systems, according to at least one example. At 1402, the process 1400 includes receiving first image data from a cart. The image data is received from an omnidirectional imaging system of the cart as described herein.

At 1404, the process 1400 includes determining a location of the cart. The location of the cart may be determined based on sensor data, such as RFID data received from shelving or other location data received from sensors. In some examples, the location may be determined based on the image data. Markers or physical elements may be visible within the image data that may be used to localize the cart within the facility.

At 1406, the process 1400 includes determining facility data. As described herein, the facility data may include inventory data, organization data, cleanliness data, store layout data, or other such data as described herein. The facility data may be determined based on the image data by processing the image data to identify items, locations, and other such information within the facility.

At 1408, the process 1400 includes storing the facility data. The facility data may be stored at the server 120. The facility data may be used to update stored facility data, such as to update an inventory management system of the facility or generate notifications or alerts as described above.

Figure 15:
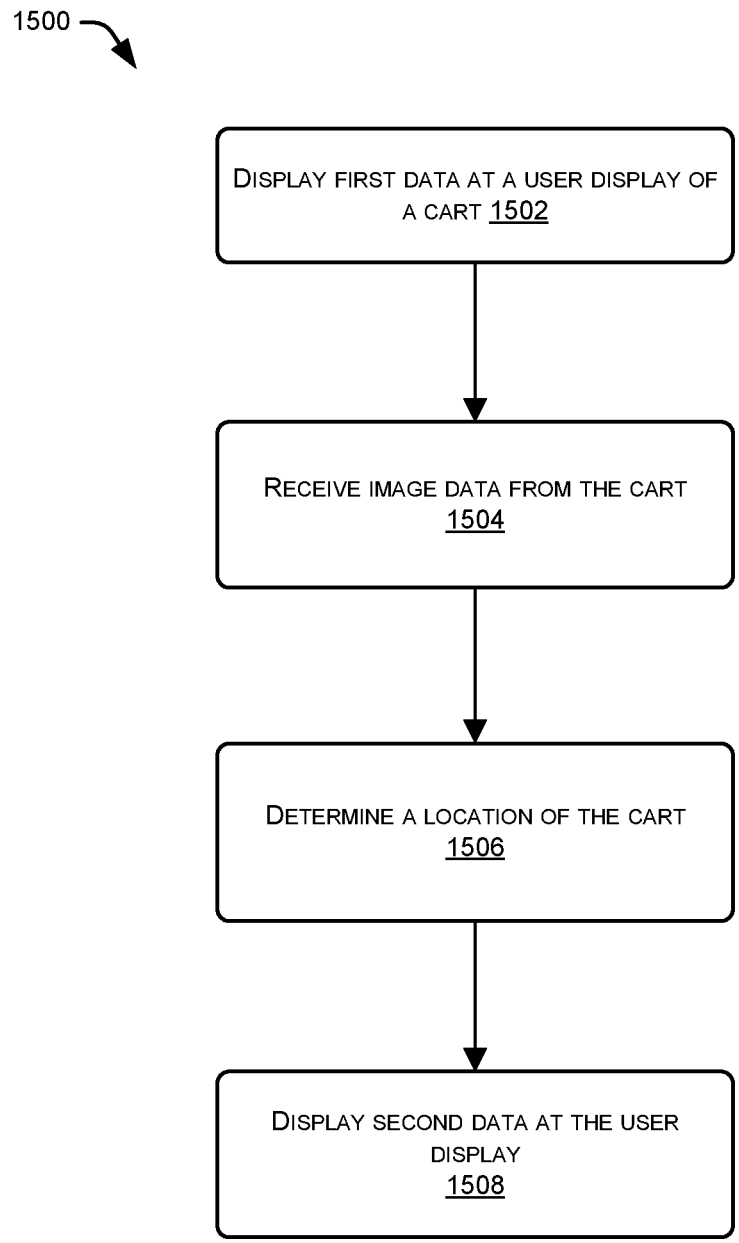
FIG. 15 illustrates a flow diagram of an example process for altering a display of a cart based on a cart location within a facility, according to at least one example.

FIG. 15 illustrates a flow diagram of an example process 1500 for altering a display of a cart based on a cart location within a facility, according to at least one example. At 1502, the process 1500 includes displaying first data at a user display of a cart. The first data may be displayed at the display 136 of the cart 104 as described above. The first data may be related to a user account or based on information associated with the facility or any other such relevant data.

At 1504, the process 1500 includes receiving image data from the cart, and specifically from the omnidirectional imaging system of the cart. The omnidirectional image data may be used to locate the cart within the facility.

At 1506, the process 1500 includes determining a location of the cart within the facility. The location may be determined based on sensor data received from the cart or from image data including visual markers or identifiers within the facility that may indicate a location or region of the facility where the cart is located.

At 1508, the process 1500 includes displaying second data at the user display. The second data may be different from the first data and may be based on the location of the cart within the facility, for example to include ads, shopping lists, or other information relevant to a particular region of the facility where the cart and user are located.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A shopping cart comprising:
a frame comprising:
   a bottom having a perimeter; and
   one or more sides coupled to and extending upward from the perimeter of the bottom, the bottom and the one or more sides defining a basket;
a handlebar coupled to the frame at an upper edge of the basket;
an imaging system coupled to the frame adjacent the handlebar, the imaging system comprising:
   a housing;
   a first imaging device positioned within the housing, having a field of view covering at least one hundred and eighty degrees and directed in a first direction;
   a second imaging device positioned within the housing, having a field of view covering at least one hundred and eighty degrees and directed in a second direction opposite the first direction, the second imaging device positioned proximate to the first imaging device;
one or more processors; and
one or more computer-readable media storing computer-executable instructions that, when executed, cause the one or more processors to perform acts comprising:
   receiving first image data from the first imaging device;
   receiving second image data from the second imaging device;
   determining that the first image data or the second image data includes a representation of an item being placed into the basket; and
   storing an association between the representation of the item and a virtual listing of items associated with a user operating the shopping cart.

2. The shopping cart of claim 1, wherein determining that the first image data or the second image data includes a representation of the item comprises determining that the first image data or the second image data comprises an item identifier.

3. The shopping cart of claim 1, further comprising a proximity sensor configured to detect an item being brought to the basket, and wherein the one or more computer-readable media further store computer-executable instructions that, when executed, cause the one or more processors to perform additional acts comprising:
   receiving proximity data indicative of an item being brought towards the basket; and
   determining that the first image data or the second image data includes the representation of the item is in response to the proximity data.

4. The shopping cart of claim 1, further comprising a user interface adjacent the handlebar, the user interface configured for the user to input data corresponding to one or more items placed in the basket.

5. The shopping cart of claim 4, further comprising a scale coupled to the frame, the scale communicatively coupled with the user interface, and wherein the one or more computer-readable media further store computer-executable instructions that, when executed, cause the one or more processors to perform additional acts comprising:
   receiving weight data from the scale in response to the item being placed on the scale, and wherein storing the association between the representation of the item and the virtual listing comprises storing the weight data with the virtual listing of items.

6. A mobile apparatus comprising:
a frame comprising:
   a bottom having a perimeter;
   one or more sides coupled to and extending upward from the perimeter of the bottom, the bottom and the one or more sides defining a receptacle;
an imaging system coupled to the frame, comprising two or more imaging devices configured to capture image data of an environment in and around the mobile apparatus;
one or more processors; and
one or more computer-readable media storing computer-executable instructions that, when executed, cause the one or more processors to:
   receive image data from the imaging system, the image data representing a three hundred and sixty degree view around the imaging system;

determine that the image data includes a representation of an item being placed into the receptacle;
determine that the item is within a threshold distance of the receptacle;
cause a light coupled to the frame to illuminate in response to the item being within the threshold distance of the receptacle; and
store an association between the item and a virtual listing of items associated with the mobile apparatus.

7. The mobile apparatus of claim 6, wherein the instructions comprise further instructions that, when executed, cause the one or more processors to:
determine, based at least in part on the image data, facility data describing a condition of the facility; and
convey the facility data to a computing device associated with the facility to update a facility management system based on the facility data.

8. The mobile apparatus of claim 7, wherein the facility data comprises at least one of:
inventory data;
facility layout data; or
facility state data.

9. The mobile apparatus of claim 6, wherein the instructions comprise further instructions that, when executed, cause the one or more processors to:
determine that one or more users interact with one or more items placed in the receptacle based on the image data;
associate one or more users with the mobile apparatus in response to determining that the one or more users interact with the one or more items placed in the receptacle; and
store user interactions of the one or more users with environment elements based on the image data.

10. The mobile apparatus of claim 6, further comprising a scale coupled to the frame and configured to capture a weight of items within the receptacle, and wherein the instructions comprise further instructions that, when executed, cause the one or more processors to:
cause the scale to tare in response to the item being brought to the receptacle;
receive item weight data from the scale in response to the item being placed in the receptacle; and
store the item weight data with the virtual listing of items.

11. The mobile apparatus of claim 6, further comprising a interface unit removably coupled to frame, the interface unit comprising:
the imaging system; and
a scale system;
wherein the instructions comprise further instructions that, when executed, cause the one or more processors to:
determine an origin location for an item retrieved by a user based on the image data;
determine an item identity based at least in part on the origin location;
receive an item weight from the scale system in response to the item being placed on the scale system; and
store the item weight with the virtual listing of items.

12. The mobile apparatus of claim 6, wherein the instructions comprise further instructions that, when executed, cause the one or more processors to:
determine, based at least in part on the image data, a location of the mobile apparatus within a facility;
determine an item identity based at least in part on the representation of the item in the image data and the location of the mobile apparatus; and
wherein the association between the representation of the item and the virtual listing further comprises the item identity.

13. The mobile apparatus of claim 12, further comprising a user interface configured to receive user to interaction data, and wherein the instructions comprise further instructions that, when executed, cause the one or more processors to:
display first data at the user interface;
determine, based at least in part on the image data, a location of the mobile apparatus within a facility; and
display second data at the user interface in response to determining the location within the facility.

14. The mobile apparatus of claim 6, wherein a distance between the two or more cameras of the imaging system is less than three inches.

15. A system, comprising:
one or more mobile apparatuses comprising:
one or more wheel casters;
a frame defining a basket to receive an item;
a handlebar to propel the mobile apparatus;
an imaging system coupled to the frame and configured to capture image data of an environment in and around the mobile apparatus; and
a computing system configured to identify items placed into the basket based at least in part on the image data and store an association between the item and a virtual listing of items associated with a user operating the mobile apparatus; and
a remote computing device comprising:
one or more processors; and
one or more computer-readable media storing computer-executable instructions that, when executed, cause the one or more processors to:
receive image data from the one or more mobile apparatuses;
determine item data based at least in part on the image data, wherein the item data comprises item location data;
determine, based at least in part on the item location data, a layout of a facility; and
store the item data, wherein storing the item data comprises updating a stored representation of the layout of the facility based on the facility data.

16. The system of claim 15, wherein the item data comprises inventory data describing a quantity of an item in a facility, and the instructions comprise further computer-executable instructions that, when executed, cause the one or more processors to:
determine, based at least in part on the inventory data, facility inventory data describing total inventory within the facility, and wherein storing the item data comprises updating a stored inventory listing of the facility based on the facility inventory data.

17. The system of claim 15, wherein the instructions comprise further computer-executable instructions that, when executed, cause the one or more processors to:
determine user interaction data based at least in part on the image data, the user interaction data describing an interaction between a user and an item in an environment around the mobile apparatus, and wherein determining the item data comprises determining an identity of the item.

18. The system of claim 17, wherein the instructions comprise further computer-executable instructions that, when executed, cause the one or more processors to:
determine a user association with a mobile apparatus of the one or more mobile apparatuses;

convey the user interaction data to the mobile apparatus, the mobile apparatus configured to update a virtual listing of items associated with the user based on the user interaction data.

19. The system of claim 15, the imaging system comprising two or more imaging devices.

20. The system of claim 19, the two or more imaging devices positioned within a housing.

* * * * *